(12) United States Patent
Ketterer et al.

(10) Patent No.: US 11,499,810 B2
(45) Date of Patent: Nov. 15, 2022

(54) ACQUISITION DEVICE AND METHOD FOR ACQUIRING SETS OF MULTIPLE OBJECT DATA OF AT LEAST ONE OBJECT

(71) Applicant: Robert Bosch GmbH, Stuttgart (DE)

(72) Inventors: Darno Alexander Ketterer, Renningen (DE); Christin Ketterer, Renningen (DE); Julian Weiss, Leonberg (DE); Sebastian Schmitt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/758,236

(22) PCT Filed: Oct. 26, 2018

(86) PCT No.: PCT/EP2018/079479
§ 371 (c)(1),
(2) Date: Apr. 22, 2020

(87) PCT Pub. No.: WO2019/081748
PCT Pub. Date: May 2, 2019

(65) Prior Publication Data
US 2020/0326181 A1    Oct. 15, 2020

(30) Foreign Application Priority Data
Oct. 27, 2017    (DE) .......................... 102017219407.3

(51) Int. Cl.
*H04N 5/247* (2006.01)
*G01B 11/04* (2006.01)
(Continued)

(52) U.S. Cl.
CPC .............. *G01B 5/0002* (2013.01); *B07C 3/08* (2013.01); *B07C 5/10* (2013.01); *B07C 5/28* (2013.01);
(Continued)

(58) Field of Classification Search
CPC .... G01B 11/24; G01B 11/04; H04N 5/23299; H04N 5/2253; H04N 5/247; H04N 7/18;
(Continued)

(56) References Cited

U.S. PATENT DOCUMENTS

2004/0099508 A1*  5/2004  Larsen ................... B65G 17/20
                                                     198/678.1
2006/0273167 A1  12/2006  Baldassari et al.
(Continued)

FOREIGN PATENT DOCUMENTS

CN    106247986 A    12/2016
CN    106391493 A    2/2017
(Continued)

OTHER PUBLICATIONS

International Search Report for PCT/EP2018/079479, dated Feb. 19, 2019.

*Primary Examiner* — Thai Q Tran
*Assistant Examiner* — Jose M Mesa
(74) *Attorney, Agent, or Firm* — Norton Rose Fulbright US LLP; Gerard Messina

(57) ABSTRACT

An acquisition device for at least semiautomated acquisition of sets of multiple object data of at least one object, including a movement device for generating a defined relative movement between at least one object data acquisition unit and the at least one object.

31 Claims, 11 Drawing Sheets

(51) Int. Cl.
| | |
|---|---|
| *G01B 11/24* | (2006.01) |
| *G01D 21/02* | (2006.01) |
| *B07C 5/10* | (2006.01) |
| *B07C 5/28* | (2006.01) |
| *B07C 5/36* | (2006.01) |
| *B07C 3/08* | (2006.01) |
| *G01B 5/00* | (2006.01) |
| *H04N 5/232* | (2006.01) |
| *H04N 5/225* | (2006.01) |
| *H04N 7/18* | (2006.01) |
| *B25J 9/16* | (2006.01) |

(52) U.S. Cl.
CPC ............... *B07C 5/36* (2013.01); *B25J 9/1664* (2013.01); *B25J 9/1669* (2013.01); *B25J 9/1697* (2013.01); *G01B 11/04* (2013.01); *G01B 11/24* (2013.01); *G01D 21/02* (2013.01); *H04N 5/2253* (2013.01); *H04N 5/23299* (2018.08); *H04N 5/247* (2013.01); *H04N 7/18* (2013.01); *B07C 2501/0063* (2013.01); *G01B 2210/54* (2013.01)

(58) Field of Classification Search
CPC .... B07C 5/10; B07C 5/28; B07C 5/36; B07C 2501/0063; B25J 9/1664; B25J 9/1669; B25J 9/1697; G01D 21/02
See application file for complete search history.

(56) References Cited

U.S. PATENT DOCUMENTS

| | | | |
|---|---|---|---|
| 2010/0082151 | A1 | 4/2010 | Young et al. |
| 2010/0149534 | A1* | 6/2010 | White ................ G01N 21/9515 356/398 |
| 2014/0111615 | A1 | 4/2014 | McGuire et al. |
| 2018/0281197 | A1* | 10/2018 | Shiraishi ................ B25J 9/1669 |
| 2019/0015980 | A1* | 1/2019 | Kojima ................ B25J 9/1671 |

FOREIGN PATENT DOCUMENTS

| | | |
|---|---|---|
| CN | 107121089 A | 9/2017 |
| DE | 102009026305 | 2/2011 |
| DE | 102016004713 A1 | 10/2017 |

* cited by examiner

ACQUISITION DEVICE AND METHOD FOR ACQUIRING SETS OF MULTIPLE OBJECT DATA OF AT LEAST ONE OBJECT

BACKGROUND INFORMATION

An acquisition device for acquiring sets of multiple object data of at least one object has already been provided.

SUMMARY

In accordance with an example embodiment of the present invention, an acquisition device for at least semiautomated acquisition of sets of multiple object data of at least one object, including a movement device for generating a defined relative movement between at least one object data acquisition unit and the at least one object, is provided.

A "set of object data" includes at least two different object data regarding the same object. A set of multiple object data preferably includes more than ten different object data about the same object. It is particularly preferable for a set of multiple object data to include more than a hundred different object data about the same object. A set of multiple object data preferably includes at least two different types of object data about the same object. "Object data" are to be understood as, in particular, at least one information item, which is suitable for characterizing an object, in particular, for distinguishing it from another object. Object data preferably include characteristics inherent to an object. Object data may include, in particular, appearance, shape, contour, color, symmetry, weight, material, and/or another characteristic appearing meaningful to one skilled in the art. It is also possible for situation-dependent characteristics to be acquired, for example, a positioning relative to a further object, in particular, to a counterpart, a degree of contamination, and/or a temporary marking.

An "object data acquisition unit" is to be understood as, in particular, a unit, which is intended for at least acquiring a type of object data. The object data acquisition unit is preferably an imaging acquisition unit. In particular, the object data acquisition unit includes a still camera. As an alternative, the object data acquisition unit includes a motion picture camera. The object data acquisition unit preferably has a true-color camera. It is also possible for the object data acquisition unit to have an infrared camera and/or ToF camera. An object data set preferably includes at least two different photographs of the object data acquisition unit. It is particularly preferable for a set of multiple object data to include at least ten different photographs of the object data acquisition, in particular, from ten different perspectives.

A "defined relative movement" is to be understood as, in particular, a relative change of position and/or orientation, which may be actively controlled and/or regulated in at least a normal operating state of the acquisition device. A defined relative movement along each degree of freedom of motion is preferably capable of being controlled and/or regulated. In particular, in at least one normal operating state, positional data regarding the relative position and/or orientation of the object data acquisition unit with respect to the object may be assigned to each acquisition of object data by the object data acquisition unit.

A movement device for generating a defined relative movement includes at least a drive unit and a guide unit. A drive unit of the movement device is preferably electromechanical, in particular, takes the form of an electric motor or, for example, a piezoelectric element for fine adjustment. However, it is also possible for a drive unit of the movement device to be pneumatic or hydraulic. A guide unit is intended, in particular, for guiding an object along the defined relative movement. In particular, a guide unit is intended for minimizing a movement along a direction, which deviates from the defined relative movement. A guide unit may take the form of, for example, a guide rail, swivel arm and/or articulated arm. Preferably, the movement device is intended for generating a defined relative movement between at least one object data acquisition unit and the at least one object. In particular, the movement device is intended for generating a defined relative movement between at least one object data acquisition unit and an object carrier unit, which is provided, in particular, for positioning the object in an object data acquisition region of the acquisition device.

"Semiautomated acquisition" is understood to mean that in at least one operating state, at least one set of multiple object data is acquired without manipulation, that is, in particular, without the action of an operator.

In particular, "intended" is to be understood as specially programmed, designed and/or equipped. That an object is intended for a particular function, is to be understood to mean, in particular, that the object fulfills and/or executes this particular function in at least one application state and/or operating state.

Due to the example embodiment of the acquisition device according to the present invention, a large quantity of object data regarding an object may be acquired advantageously rapidly.

In addition, it is provided that the example movement device be intended for acquiring object data from multiple perspectives. In particular, object data from multiple perspectives may be acquired, using a defined relative movement of the object data acquisition unit and the object, generated with the aid of the movement device. A "perspective" is to be understood as, in particular, a particular, relative configuration, in particular, position and/or orientation, of the object data acquisition unit and of the object, in particular, of the object carrier unit. Two perspectives are preferably considered identical, if they only differ by a relative distance between the object data acquisition unit and the object. In particular, multiple perspectives include at least two different relative configurations of the object data acquisition unit and of the object, in particular, of the object carrier unit. Multiple perspectives preferably include more than ten different relative configurations of the object data acquisition unit and of the object, in particular, of the object carrier unit. It is particularly preferable for multiple perspectives to include more than ten different configurations of the object data acquisition unit relative to the object, in particular, to the object carrier unit. In particular, two perspectives define a measuring plane. Multiple perspectives preferably include at least two different measuring planes. The totality of all of the measuring planes possible, using the movement device, preferably fills the space. Alternatively, a distance between two possible measuring planes is at least less than 1 mm, and/or an angular distance between two possible measuring planes is at least less than 1°. The embodiment of the acquisition device according to the present invention may allow sets of multiple object data to advantageously include object data from all sides of the object.

In addition, in an example embodiment of the present invention, the acquisition device includes a processing unit, which is intended for carrying out an object learning operation. An "object learning operation" is to be understood as, in particular, processing of the sets of multiple object data for an additional application. For example, an object learning operation may include the generation of a panoramic view of the object, the generation of a three-dimensional model of the object and/or the extraction of characteristic features, in particular, to allow pattern recognition. Preferably, the processing unit is constructed to be spatially separated from the movement device and/or from the object data acquisition unit. The processing unit preferably takes the form of a server. Alternatively, the processing unit is integrated in the object data acquisition unit. A "processing unit" is to be understood as, in particular, a unit including an information input, information processing, and an information output. The processing unit advantageously includes at least one processor, a storage device, input and output devices, further electrical components, an operating program, regulating routines, control routines, and/or computation routines. The components of the processing unit are preferably situated on a common board and/or advantageously situated in a common housing. The embodiment of the acquisition device according to the present invention may allow, in particular, processing of the sets of multiple object data to form a uniform digital representation of the object.

In addition, a further processing unit is provided in accordance with an example embodiment of the present invention, which is intended for using a forward movement and return movement of an object data acquisition unit and/or of an object for data acquisition. The movement device and the object data acquisition unit are preferably controlled and/or regulated by a, in particular, central, processing unit. In particular, the processing unit controls and/or regulates the defined, relative movement and at least the acquisition time of the object data acquisition unit. The example movement device preferably has a defined starting position, from which a defined, relative movement starts. The further processing unit is preferably intended, in particular, for specifically generating and/or changing a forward movement and return movement of an object data acquisition unit and/or of an object for precise data acquisition. A "starting position of the movement device" is to be understood to mean, in particular, that at least the object data acquisition unit and/or the object, in particular, the object carrier unit, are situated at a fixed position inside of the movement device. The starting position of the movement device preferably includes an orientation of the object data acquisition unit and/or of the object, in particular, of the object carrier unit. In a starting position of the movement device, it is particularly preferable for all of the movable units and elements of the movement device to be situated at a fixed position and to have a fixed orientation. A "forward movement" is to be understood as, in particular, a movement, which leads away from the starting position. A "return movement" is to be understood as, in particular, a movement, which leads to the starting position. A return movement may be carried out by reversing the path of motion during a forward movement, or by moving further along a closed path of motion. The embodiment of the acquisition device according to the present invention may allow an idle time of the machine between two acquisitions of different sets of multiple object data, for restoring the starting position of the movement device, to be minimized in an advantageous manner.

In addition, in an example embodiment of the present invention, it is provided that the movement device have at least one movement unit for a defined movement of the at least one object data acquisition unit. The movement unit includes at least a guide unit of the object data acquisition unit and a drive unit. Furthermore, it is provided that the movement unit be intended for guiding the at least one object data acquisition unit on an at least partially curved path of motion. A "partially curved path of motion" is to be understood to mean, in particular, that a course of the path of motion has a curvature other than zero in at least a subregion. It is preferably understood to mean that the path of motion includes a circular arc. The circular arc preferably spans a central angle of more than 90°. It is particularly preferable for the circular arc to span a central angle of more than 180°. It is also possible for the path of motion to trace a complete circle. In particular, a central point of a circular arc of the at least partially curved path of motion defines a center of an object measuring region, which is intended for receiving an object for measurement. In this connection, a "curvature" at a point of a curve, which is other than zero, is to be understood as, in particular, a deviation from a straight line, which increases quadratically with a distance from the point of the curve. Using the example embodiment of the acquisition device according to the present invention, a change of perspective may easily be executed in an advantageous manner.

In addition, it is provided that the movement unit have at least a partially curved path and be intended for guiding the least one object data acquisition unit along the at least partially curved path. For guiding the object data acquisition unit, the movement unit preferably has a curved track as a guide unit, in particular, a curved guide rail and/or a curved guide bar. The object data acquisition unit is preferably mounted on a guide block, which, in at least one operating state of the acquisition device, is moved by the drive unit along the curved path. A "partially curved path of motion" is to be understood to mean, in particular, that a course of the path has a curvature other than zero in at least a subregion. It is preferably understood to mean that, in particular, the path includes a circular arc. The circular arc preferably spans a central angle of more than 90°. It is particularly preferable for the circular arc to span a central angle of more than 180°. It is also possible for the path to trace a complete circle. It is also possible for a curvature of the path to be approximated by at least two straight path segments, which subtend an obtuse or acute angle. The path segments are preferably joined together by a curved path segment to form a continuous path of motion of the object data acquisition unit. Alternatively, each, in particular, straight, path segment has at least one separate object data acquisition unit. Using the embodiment of the acquisition device according to the present invention, a change of perspective may easily be executed in an advantageous manner.

In addition, in accordance with an example embodiment of the present invention, it is provided that the movement unit be intended for guiding the at least one object data acquisition unit along a direction at least substantially perpendicular to a path of motion. In particular, the movement unit may generate a superposed movement of the object data acquisition unit along the path of motion and perpendicular to the path of motion.

Here, the expression "substantially perpendicular" shall define, in particular, an orientation of a direction relative to a reference direction; in particular, viewed in a plane, which extends parallelly to the direction and the reference direction, the direction and the reference direction forming an angle of 90°, and the angle having a maximum deviation of, in particular, less than 8°, advantageously, less than 5°, and particularly advantageously, less than 2°. In particular, the object data acquisition unit is movably supported along a straight line, which intersects the object measuring region and the object data acquisition unit. The embodiment of the acquisition device according to the present invention may advantageously allow a working distance of the object data acquisition unit, in particular, a focus, to be adjusted rapidly and simply. In particular, an inexpensive object data acquisition unit having a short range of the working distance may be used. It is also possible for the movement unit to have a swivel axis and/or axis of rotation, about which the guide unit of the object data acquisition unit itself is pivoted and/or rotationally mounted. The embodiment of the acquisition device according to the present invention may allow sets of multiple object data to advantageously include object data from all sides of the object. It is also possible for the guide unit of the object data acquisition unit to be movably supported in a translational manner, in order to measure, in particular, an object, which has a maximum extension that is greater than a maximum extension of the guide unit.

In addition, in accordance with an example embodiment of the present invention, it is provided that the object data acquisition unit include at least one swivel axis and/or axis of rotation, about which the object data acquisition unit is pivoted and/or rotationally mounted. In particular, the object data acquisition unit is pivoted and/or rotationally mounted about a straight line, which intersects the object measuring region and the object data acquisition unit. Using the embodiment of the acquisition device according to the present invention, a measuring region, in particular, an image format, of an, in particular, imaging, object data acquisition unit may be adapted to the object in an advantageous manner. The object data acquisition unit preferably includes an axis of rotation and/or swivel axis, which is substantially perpendicular to the path of motion of the object data acquisition unit. In particular, during and/or after a movement along the path of motion, the axis of rotation and/or swivel axis preferably allows a side of the object data acquisition unit intended for measurement to be oriented substantially perpendicularly to a line, which intersects the object measuring region and the object data acquisition unit. Using the embodiment of the acquisition device according to the present invention, a measuring region of an object data acquisition unit may be adapted to an object. Object data may be maximized by a measurement, while data regarding a background may be simultaneously minimized.

In addition, in accordance with an example embodiment of the present invention, the movement unit includes a drive unit, which is intended for moving the object data acquisition unit in an automated manner. In particular, "automated" is to be understood to mean that the drive unit is controlled and/or regulated by a, in particular, central, processing unit. In particular, the processing unit controls and/or regulates the drive unit in light of a list of perspectives, in particular, determined beforehand, from which the object is intended to be measured. In a further refinement of the present invention, the processing unit evaluates a data set preliminarily, in order to adjust the list dynamically. A set of multiple data may be acquired rapidly in an advantageous manner.

Furthermore, in accordance with an example embodiment of the present invention, it is provided that the acquisition device include at least one, in particular, the above-mentioned, object carrier unit; the movement device including a bearing unit, by which the object carrier unit is supported so as to be movable, in particular, rotatable, relative to the object data acquisition unit. The object carrier unit is intended, in particular, for positioning the object in an object data acquisition region of the acquisition device. In particular, the object carrier unit includes at least one object carrier having an object carrier wall, which is intended for absorbing the weight of an object. In particular, in at least one operating state of the acquisition device, the object carrier is designed, such that an object is laid down on the object carrier, in particular, on the object carrier wall. The object carrier wall preferably has no indentations and/or projections. Alternatively, the object carrier wall may have a curvature, in order to reduce the probability that, in particular, a round object and/or a light object falls off the object carrier. It is also possible for a, in particular, interchangeable object carrier to have a retention unit for fixing an object in position on the object carrier. The object carrier is preferably circularly formed in at least one sectional plane. The bearing unit preferably includes at least one swivel axis and/or axis of rotation, about which the object carrier unit is pivoted and/or rotationally mounted. The object carrier unit preferably includes a vertical swivel axis and/or axis of rotation. The swivel axis and/or axis of rotation preferably coincides with an axis of symmetry of the object carrier unit. The example embodiment of the acquisition device according to the present invention allows a set of multiple object data to include object data from different sides of the object. An object measuring region may be identified clearly by the embodiment of the acquisition device according to the present invention. In particular, optimum positioning of an object to be measured in the object measuring region is facilitated. The embodiment of the acquisition device according to the present invention may advantageously allow a defined, relative movement of the object and the object data acquisition unit to be designed in various ways.

In accordance with the present invention, it is also provided that the bearing unit embrace the object carrier unit at least partially. "Partially embrace" is to be understood to mean, in particular, that the object carrier unit is situated in a recess of the bearing unit. Preferably, "partially embrace" is to be understood to mean that the largest side face of a smallest, conceived, right parallelepiped, which the unit only just surrounds completely, extends into a recess of the bearing unit. In particular, this should be understood to mean that in at least one plane, in which a geometric center of the object carrier unit lies, at least the geometric center is surrounded by the bearing unit over an angular range of at least 140°, preferably, 180°. The object carrier unit is preferably situated at a lateral recess of the bearing unit. Alternatively, the bearing unit is positioned at a lower side of the object carrier unit, in particular, a side opposite to the object measuring region. The bearing unit is preferably offset from the vertical axis of rotation and/or swivel axis, so that, in particular, a path of motion of the object data acquisition unit may be extended underneath the object carrier unit. The example embodiment of the acquisition device according to the present invention may allow a sturdy set-up of the object carrier unit to be achieved. In particular, a set-up of the bearing unit offset from the axis of rotation may be attained.

In addition, in accordance with an example embodiment of the present invention, it is provided that the bearing unit have at least one path of motion, along which the object carrier unit is movably supported. The path of motion is preferably parallel to a line, which intersects the object measuring region and the object data acquisition unit. In particular, the path of motion runs vertically. The object carrier unit is preferably supported by the bearing unit so as to be able to move translationally along a linear axis running at least substantially parallelly to, in particular, coaxially with, the axis of rotation and/or swivel axis. The bearing unit preferably includes a lifting unit, with the aid of which the object carrier unit is movably supported along the path of motion. The lifting unit may take the form of a scissor joint, linear bearing, telescopic bearing, or the like. The example embodiment of the acquisition device according to the present invention may advantageously allow a working distance, in particular, a focus, to be adjusted rapidly and simply. In particular, an inexpensive object data acquisition unit having a short range of the working distance may be used. Alternatively, or in addition, a horizontal path of motion is also possible, in order to measure an object, which has a maximum extension that is greater than a maximum extension of the object carrier unit.

In addition, in accordance with an example embodiment of the present invention, it is provided that the movement device includes a drive unit, which is intended for moving the object carrier unit in an automated manner. To move the object carrier unit, the drive unit may include at least one actuator, in particular, a linear actuator, such as an electric, hydraulic or pneumatic lifting cylinder or the like, an electric motor, an electromagnetically operated mechanism, or the like. In particular, "automated" is to be understood to mean that the drive unit is controlled and/or regulated by a, in particular, central, processing unit. In particular, the processing unit controls and/or regulates the drive unit in light of a list of perspectives, in particular, determined beforehand, from which the object is intended to be measured. In a further refinement, the processing unit could evaluate a data set preliminarily, in order to adjust the list dynamically. A set of multiple data may be acquired rapidly in an advantageous manner.

Furthermore, in accordance with an example embodiment of the present invention, it is provided that the movement device includes a drive unit, in particular, the one mentioned above, which is intended for moving the object carrier unit and the object data acquisition unit in directions opposite to each other, in particular, for moving them contrarotationally about a swivel axis and/or axis of rotation, in particular, in at least one operating state of the acquisition device. In at least one further operating state of the acquisition device, it is also possible for the drive unit to be intended for moving the object carrier unit and the object data acquisition unit relative to each other in the same moving direction, in particular, in the same moving direction about the swivel axis and/or axis of rotation of the bearing unit, in particular, at different speeds. Furthermore, in at least one additional operating state of the acquisition device, it is also possible for the drive unit to be intended for holding the object carrier unit in a fixed position and for moving only the object data acquisition unit relative to the object carrier unit, in particular, about the swivel axis and/or axis of rotation of the bearing unit. The drive unit preferably includes at least one actuator, which is assigned to the object carrier unit, and a further actuator, which is assigned to the object data acquisition unit. However, it is also possible for the drive unit to have a single actuator, which is provided for moving the object carrier unit and the object data acquisition unit via a gear unit. In addition, it is also possible for the drive unit to take the form of an electromagnetically operated unit and to be intended for moving the object carrier unit and the object data acquisition unit in directions opposite to each other, in particular, for moving them contrarotationally about a swivel axis and/or axis of rotation of the bearing unit. The drive unit is preferably intended for moving the object carrier unit and the object data acquisition unit along opposite, main moving directions. The drive unit is preferably intended for moving the object data acquisition unit along a direction about the object carrier unit, and for moving the object carrier unit about the swivel axis and/or axis of rotation of the bearing unit, in a direction opposite to the object data acquisition unit. With the aid of the embodiment of the present invention, a plurality of different photographs of an object from various measurement angles may advantageously be taken in a short time span, in order to acquire a set of multiple data for the object in an advantageous manner.

In addition, in accordance with an example embodiment of the present invention, it is provided that the acquisition device includes at least the object data acquisition unit and at least one further object data acquisition unit, which are supported by the movement device so as to be movable relative to each other. The object data acquisition unit and the further object data acquisition unit may be designed to be identical or structurally different. For example, it is possible for the object data acquisition unit to be intended for recording image data of an object, and for the further object data acquisition unit to be intended for recording dimensions of the object. Further potential applications of the object data acquisition unit and of the further object data acquisition unit, appearing useful to one skilled in the art, are possible, as well. The object data acquisition unit is preferably supported by the movement device so as to be movable relative to a horizontal plane of the acquisition device, along an angular range of less than 360°, in particular, less than 270°, preferably, less than 180°, and particularly preferably, less than 100°. The further object data acquisition unit is preferably supported by the movement device so as to be movable relative to a horizontal plane, along an angular range of less than 360°, in particular, less than 270°, preferably, less than 180°, and particularly preferably, less than 100°. The horizontal plane preferably runs at least substantially parallelly to a major surface of extension of the object carrier unit. In a state of an object situated on the object carrier unit, the object preferably rests against the major surface of extension of the object carrier unit. The horizontal plane advantageously runs at least substantially perpendicularly to the swivel axis and/or axis of rotation of the bearing unit. The object data acquisition unit and/or the further object data acquisition unit is/are additionally supported by the movement device so as to be movable about the swivel axis and/or axis of rotation of the bearing unit. With the aid of the example embodiment of the present invention, a plurality of different photographs of an object from various measurement angles may advantageously be taken at least substantially simultaneously in a short time span, by the object data acquisition unit and the further object data acquisition unit, in order to acquire a set of multiple data for the object in an advantageous manner.

In addition, in accordance with an example embodiment of the present invention, it is provided that the acquisition device includes at least one, in particular, the above-mentioned, object carrier unit, which is supported by the movement device so as to be able to move relative to the object data acquisition unit and to the further object data acquisition unit. The object carrier unit is preferably supported by the bearing unit so as to able to rotate around the swivel axis and/or axis of rotation, relative to the object data acquisition unit and to the further object data acquisition unit. The object carrier unit is preferably supported so as to be able to rotate around the swivel axis and/or axis of rotation of the bearing unit along an angular range of at least 360°. Alternatively, or in addition, the object carrier unit is supported by the bearing unit so as to be able to move translationally along the linear axis, relative to the object data acquisition unit and to the further object data acquisition unit. The embodiment of the present invention advantageously allows a high variability with regard to the positioning of the object carrier unit relative to the object data acquisition unit and to the further object data acquisition unit. For many different objects, advantageous positioning of the object carrier unit, the object data acquisition unit and the further object data acquisition unit may be advantageously attained for acquisition of different photographs of an object, in particular, in order to allow a precise measurement of the object for generating a set of multiple data for the object.

Furthermore, in accordance with an example embodiment of the present invention, it is provided that the acquisition device include the at least one object data acquisition unit, which has the at least two acquisition units, in particular, two cameras, that are movably supported with the aid of the movement device. The at least two acquisition units, in particular, the two cameras, are preferably supported by the movement device so as to be able to move relative to each other and/or relative to the object carrier unit. The at least two acquisition units, in particular, the two cameras, may be supported by the movement device so as to be able to rotate about the swivel axis and/or axis of rotation of the bearing unit; movably supported so as to be able to swivel in a vertical plane of the acquisition device containing the swivel axis and/or axis of rotation of the bearing unit; supported so as to be able to move relative to each other in the vertical plane of the acquisition device containing the swivel axis and/or axis of rotation of the bearing unit; and/or supported so as to be able to move along and/or about a further axis appearing useful to one skilled in the art. The at least two acquisition units are preferably cameras differently formed or equipped. The at least two acquisition units may differ, for example, in a form of an objective, of a focusing region, of a measuring angle, of an image sensor, and/or in other parameters appearing useful to one skilled in the art. Using the example embodiment of the present invention, a large variety of photograph scenarios may be implemented, in particular, in order to allow precise measurement of the object for generating a set of multiple data for the object.

In addition, in accordance with an example embodiment of the present invention, it is provided that the object carrier unit includes at least one object carrier, which has an object carrier wall that is transparent in at least one operating state. "Transparent" is to be understood to mean, in particular, that a transmittance of the object carrier wall, in particular, at a medium wavelength of the spectrum detectable by the object data acquisition unit, is at least greater than 80%, preferably, greater than 90%, and particularly preferably, greater than 95%. The object carrier is preferably made of a transparent material, for example, glass or a polycarbonate. A side of the object facing the object carrier wall may advantageously be measured, using a position of the object data acquisition unit on a side of the object carrier opposite to the object.

Furthermore, in accordance with an example embodiment of the present invention, it is provided that the object carrier unit has a setting unit, with the aid of which a reflectance, absorbance, and/or transmittance is adjustable. On the object carrier wall, the object carrier preferably has a layer of material, which changes its optical characteristics due to the application of an electric voltage. On the object carrier wall, the object carrier has, in particular, a layer of electrochromic glass or liquid crystal glass. The setting unit is preferably intended for supplying the layer with an adjustable voltage. Using the embodiment of the acquisition device according to the present invention, a change may advantageously be made between a transparent background and an opaque background in a simple manner.

In addition, in accordance with the present invention, it is provided that the object carrier unit is intended for active illumination. "Active illumination" is to be understood to mean, in particular, that the object carrier unit includes an illumination unit itself, and/or that viewed from the object data acquisition unit, an illumination unit is situated behind the object carrier unit and at least partially penetrates it with radiation. The object carrier preferably includes at least one layer, such as a layer of opaque milk glass, which scatters the light issuing from the illumination unit diffusely. Preferably, the illumination unit may emit light in different colors. The illumination unit preferably has two illumination elements, which are separately controllable. In a further embodiment, the illumination unit may have a plurality of separately controllable illumination elements, which are distributed over a surface that at least partially surrounds the object measuring region. Illumination of the object may advantageously be adjusted by the embodiment of the acquisition device according to the present invention. In particular, using color adaptation, a contrast of the object carrier unit with an object resting on it may be maximized.

In addition, in accordance with an example embodiment of the present invention, it is provided that the object carrier unit includes at least one light source. A light source is preferably situated on a side opposite to the object carrier wall. It is also possible for a light source to be set into the object carrier. Furthermore, it is provided that the object carrier unit includes at least one light-emitting diode, in particular, at least one organic light-emitting diode. In particular, the at least one light-emitting diode is intended for allowing the object carrier unit to be illuminated uniformly, in particular, in different, adjustable colors. Illumination of the object may advantageously be adjusted by the embodiment of the acquisition device according to the present invention. In particular, using color adaptation, a contrast of the object carrier unit with an object resting on it may be maximized.

In addition, in accordance with an example embodiment of the present invention, it is provided that the object carrier unit includes at least two detachably connected object carriers for transporting. In this connection, "detachable" should be understood as, in particular, "nondestructively separable." The object carrier unit preferably includes a counterpart complementary to the object carrier. In particular, in at least one operating state of the acquisition device, the object carrier and the complementary counterpart are joined in a form-locked and/or force-locked manner. For example, the object carrier and the complementary counterpart may be joined temporarily by a guide rail, a snap-in connection, a magnetic unit and/or a different connection appearing useful to one skilled in the art. It is also possible for the object carrier unit as a whole to be detachably connected to the bearing unit. Due to the example embodiment of the acquisition device according to the present invention, an object carrier unit may be loaded with an object in an advantageously rapid and simple manner.

In addition, in accordance with an example embodiment of the present invention, a transport unit is provided, which is intended for feeding objects to an object measuring region in an at least semiautomated manner. "To feed in a semiautomated manner" is to be understood to mean, in particular, that an object is transported without manipulation from a starting point of the transport unit into the object measuring region.

Transport from the object measuring region to an endpoint of the transport unit preferably takes place without manipulation. A starting point is, in particular, a loading zone of the transport unit. An end point is, in particular, an unloading zone of the transport unit. An exchange of an object preferably takes place automatically in the object measuring region. In particular, the transport unit is controlled by the, in particular, central, processing unit. Using the embodiment of the acquisition device according to the present invention, multiple sets of object data of a plurality of objects may be acquired in an advantageously rapid manner.

In addition, in accordance with an example embodiment of the present invention, it is provided that the transport unit includes a path conveyor unit, in particular, a conveyor belt unit. Other embodiments of the path conveyor unit are also possible, for example, a roller conveyor. Alternatively, the transport unit may take the form of an autonomous floor conveyor unit or a robot arm. Using the example embodiment of the acquisition device according to the present invention, a large number of objects may be fed to the object measuring region advantageously rapidly.

Furthermore, in accordance with an example embodiment of the present invention, it is provided that the transport unit includes a positioning unit, in order to position an object, in particular, down from the path conveyor unit, in an object measuring region. In particular, the positioning unit is configured as a drawer, gripping arm and/or magnetic arm. In particular, the positioning unit is intended for positioning an object carrier, with an object situated on it, in particular, down from the path conveyor unit, into the object measuring region. In particular, the positioning unit is intended for supplying the object carrier to the complementary counterpart of the object carrier unit and/or of the bearing unit. Using the embodiment of the acquisition device according to the present invention, an automatically transported object may advantageously be positioned in the object measuring region in a reliable manner.

In addition, in accordance with an example embodiment of the present invention, it is provided that the transport unit has at least two object carriers. The transport unit preferably includes at least ten object carriers. The example embodiment of the acquisition device according to the present invention may advantageously allow an idle time of the acquisition device, due to a loading and unloading time of the transport unit, to be minimized in an advantageous manner.

Furthermore, in accordance with an example embodiment of the present invention, a housing unit is provided, which is intended for shielding an object measuring region at least partially from the outside. The object data acquisition unit and the movement device are preferably situated at least partially in an interior chamber defined by the housing unit. The housing unit is intended, in particular, for protecting the interior chamber from dust. The housing unit preferably shields the interior chamber from electromagnetic radiation. The housing unit preferably includes an, in particular, a single, opening for positioning an object in the object measuring region. The housing unit preferably includes a sealing unit for, in particular, automatically, closing and opening the opening. Alternatively, the housing includes two openings for setting up a path conveyor unit through the housing. The housing preferably has a window onto the object measuring region. The housing preferably includes an indicating unit, in particular, a display. The indicating unit is intended, in particular, for representing at least one element of a set of multiple object data for a check. The example embodiment of the acquisition device according to the present invention may allow the acquisition device to be operated in a dusty environment, in particular, in factory buildings and/or warehouses.

In addition, in accordance with an example embodiment of the present invention, an anti-contamination unit is provided, which is intended for at least reducing contamination of an object measuring region and/or of a region of an object data acquisition unit, in particular, inside the housing unit. An "anti-contamination unit" is to be understood as, in particular, a unit, which at least reduces the number of particles, in particular, dust, in a delimited region and/or keeps them from penetrating into the region. The anti-contamination unit may include, for example, a fan, which generates a constant air stream out of the region to be protected. Preferably, a fan circulates air situated in the working area of the fan, in order to generate an air current. However, it is also possible for the fan to emit a, in particular, pure, gas, such as nitrogen, from a supply unit. Alternatively, or in addition, the anti-contamination unit may include an electrostatic unit, in particular, an ionizer, in order to reduce adhesion of particles to a surface. The example embodiment of the acquisition device according to the present invention may allow the acquisition device to be operated in a dusty environment, in particular, in factory buildings and/or warehouses.

In addition, in accordance with an example embodiment of the present invention, it is provided that the anti-contamination unit be intended for generating a pressure above atmospheric inside the housing unit. A pressure above atmospheric is preferably attained by circulating filtered air from the surrounding area of the housing unit. Alternatively, a, in particular, pure, gas from a supply unit is let into the housing unit. Using the embodiment of the acquisition device according to the present invention, a gas stream out of the housing unit may be attained.

Furthermore, a treatment unit is provided, which is intended for treating, in particular, for cleaning, at least one object prior to acquisition of a set of object data.

In addition, in accordance with an example embodiment of the present invention, it is provided that the treatment unit include a lock chamber unit. A "lock chamber unit" is to be understood, in particular, as a substructure of the housing unit, which is delimited from the object measuring region, and through which an object must pass for positioning in the object measuring region. The substructure preferably has a delimiting unit at a transition to the object measuring region. The delimiting unit may include, for example, an automatically controlled sliding door or a curtain made of elastic, mounted, plastic lamellae. The lock chamber unit preferably includes a further delimiting unit on an outer side of the substructure; the further delimiting unit being intended for bringing an object into the lock chamber unit and/or taking it out of it. At least in one regular operating state of the acquisition device, the embodiment of the acquisition device according to the present invention allows a direct connection of the object measuring region to the air surrounding the housing unit to be prevented.

In addition, in accordance with an example embodiment of the present invention, it is provided that the treatment unit includes a fluid control unit for controlling and/or regulating a fluid stream. In particular, a fluid control unit may include a fan, a gas nozzle and/or a liquid nozzle. In particular, the fluid control unit is mounted to an outer wall of the housing unit. The fluid control unit is preferably situated around the opening of the housing unit. The fluid control unit preferably generates a fluid stream, which is directed away from the opening. A fluid control unit is preferably positioned in the lock chamber unit. Contamination of an object moved into the housing unit may be reduced by the example embodiment of the acquisition device according to the present invention.

Furthermore, in accordance with an example embodiment of the present invention, a contrast unit is provided, which is intended for active illumination. A "contrast unit" is to be understood as, in particular, a unit, which, as viewed from the object data acquisition unit, is situated behind the object measuring region and provides a uniform background during measuring of the object. The contrast unit may have a curvature or may be planar. In at least one operating state of the acquisition device, the contrast unit is preferably situated directly on the object carrier unit. However, it is also possible for the contrast unit to be supported so as to be movable relative to the object carrier unit, in particular, supported so as to be movable together with the object data acquisition unit and/or together with the further object data acquisition unit. "Active illumination" is to be understood to mean, in particular, that the contrast unit itself includes an illumination unit, and/or that viewed from the object data acquisition unit, an illumination unit of the acquisition device is situated behind the contrast unit and at least partially penetrates it with radiation. The contrast unit preferably includes at least one layer, which diffusely scatters the light emanating from the illumination unit. Preferably, the illumination unit may emit light in different colors. The illumination unit preferably has at least two illumination elements, which are separately controllable. Preferably, the illumination unit may generate continuous light and/or flashing light. Alternatively, viewed from the contrast unit, an illumination unit is positioned opposite to the object carrier unit, in particular, on the guide unit for the object data acquisition unit. In a further refinement of the present invention, the object measuring region could be surrounded by an illumination unit of the acquisition device substantially completely. "To surround substantially completely" is to be understood to mean, in particular, that when the illumination unit is situated on an upper surface of a conceived three-dimensional body, which surrounds at least the object measuring region completely, the illumination unit covers at least 50%, preferably, more than 75%, of the upper surface. In particular, single, individually controllable illumination elements, in particular, spaced apart from each other, could also be situated on an upper surface of a conceived, three-dimensional body in an irregular or regular, in particular, grid-shaped pattern; the conceived, three-dimensional body completely surrounding at least the object measuring region. A subsurface of the upper surface, which results from a projection of a circular surface onto the upper surface, and on which no illumination element is situated, is preferably at least less than 50%, preferably, less than 25%. The illumination unit of the acquisition device is preferably configured in such a manner, that an object situated on the object carrier unit is illuminated from all sides, in particular, in order to illuminate the object uniformly. Alternatively, or in addition, it is possible for the illumination unit to be intended for illuminating an object situated on the object carrier unit indirectly or pointwise. Alternatively, or in addition, it is possible for the illumination unit to be intended for releasing an object situated on the object carrier unit as a result of colored illumination. For example, using an upstream color recognition operation, it is possible, in particular, for release, for a background positioned behind the object to be set to blue, green or another color with the aid of the illumination unit. The color recognition operation is preferably carried out by a camera system, in particular, by the object data acquisition unit or a mobile acquisition unit; in particular, a color content in an object being calculated and compared to a dimension of the object, in order to allow a suitable color selection for releasing the object. The illumination unit of the acquisition device preferably includes a plan view illumination unit and a front illumination unit. The plan-view illumination unit is preferably intended for illuminating an object situated on the object carrier unit from above. The front illumination unit is preferably intended for illuminating an object situated on the object carrier unit from the front, in particular, along its periphery. The plan-view illumination unit and/or the front illumination unit preferably includes at least one illumination panel, in particular, a plurality of illumination panels. The plan-view illumination unit and/or the front illumination unit preferably includes at least one illumination panel supported so as to be individually movable, in particular a plurality of illumination panels supported so as to be individually movable, in particular, in order to allow a light angle of the illumination unit relative to the object carrier unit to be set. The illumination panels of the top-view illumination unit and/or of the front illumination unit are preferably cascaded, in particular, connected in series and/or interlinked. The plan-view illumination unit and/or the front illumination unit is/are preferably controlled and/or regulated with the aid of the, in particular, central, processing unit of the acquisition device or of a system including the acquisition device. However, it is also possible for the plan-view illumination unit and/or the front illumination unit to have a separate processing unit, in particular, a DMX controller, for individual control and/or regulation of the illumination panel(s). Preferably, the illumination unit has, in particular, the plan-view illumination unit and/or the front illumination unit have, at least one, in particular, passive, cooling body. The cooling body is preferably formed in one piece with a support of the illumination panels, in particular, in the form of an extruded aluminum section. Other embodiments of the cooling body are possible, as well, such as an embodiment of the cooling body as an active cooling body, in particular, as a fluid cooling body (fan, water cooling body, etc.) or the like. At least a circuit board made of FR4 or a circuit board having an aluminum core of the illumination unit, in particular, of the plan-view illumination unit and/or of the front illumination unit, is preferably situated on the support, in particular, for controlling and/or holding individual illumination elements of the illumination unit. The circuit board is preferably fixed to the support with the aid of a force-locked, form-locked and/or continuous material connection, such as with the aid of adhesive bonding by QPad® Gap Filler II, with the aid of a screw connection, or the like. The circuit board preferably has a top coating of paint, which corresponds to a bright color, in particular, white. The circuit board preferably includes at least one copper circuit trace, which has a cross section of at least 70 µm.

In accordance with an example embodiment of the present invention, the illumination unit preferably includes illumination elements taking the form of an LED, in particular, LED chips of the manufacturers Nichia and Seoul.

However, it is also possible for the illumination elements to have a different form appearing useful to one skilled in the art. Preferably, an RGB LED, such as a Nichia RGB chip NSSM124DT, and a white LED, such as a Seoul Sunlike chip STW9C2PB-SC, form, together, an illumination element of the illumination unit; the RGB LED and the white LED being positioned, in particular, together, on a common circuit board. Preferably, the illumination element has a color temperature of 5000 K and a color-rendering index of at least 95. The illumination elements or the illumination panels are preferably positioned uniformly in such a manner, that a low thermal resistance is attainable and/or high heat dissipation is achievable. The illumination unit preferably includes at least one optical diffuser element. The optical diffuser element is preferably situated on the circuit board, in particular, on the illumination element. The optical diffuser element preferably has a maximum spacing of less than 50 mm, in particular, less than 30 mm, particularly preferably, less than 20 mm, and, particularly preferably, less than 15 mm, relative to an upper surface of the circuit board or the illumination panel, in particular, in order to attain advantageous dispersion of the light from the illumination panels, and/or in order to prevent hotspots and aliasing at least as much as possible.

The example illumination unit preferably additionally includes, in particular, a background illumination unit, which preferably has at least one illumination panel, in particular, a plurality of illumination panels, which is/are formed, in particular, in a manner analogous to the illumination panel(s) of the plan-view illumination unit and/or of the front illumination unit. The illumination panel(s) of the background illumination unit is/are preferably positioned in a slight semicircle with a large diffuser disk. Preferably, the background illumination unit is individually controllable and/or regulatable with the aid of the, in particular, central, processing unit of the acquisition device or of a system containing the acquisition device. However, it is also possible for the background illumination unit to have a separate processing unit, in particular, a DMX controller, for individual control and/or regulation of the illumination panel(s).

The example illumination unit preferably includes at least one subsurface illumination unit, which is integrated in the object carrier unit. The subsurface illumination unit is preferably intended for transilluminating the object carrier unit, in particular, in order to illuminate, from below, an object situated on the object carrier unit. Preferably, the subsurface illumination unit is individually controllable and/or regulatable with the aid of the, in particular, central, processing unit of the acquisition device or of a system containing the acquisition device. However, it is also possible for the subsurface illumination unit to have a separate processing unit, in particular, a DMX controller, for individual control and/or regulation of the illumination panel(s). The subsurface illumination unit preferably includes illumination elements or illumination panels, which are formed in a manner analogous to the illumination elements or the illumination panels of the plan-view illumination unit and/or the front illumination unit. Preferably, the illumination elements are uniformly distributed on the object carrier unit as groups, in particular, having at least five illumination elements in a group. Heat dissipation of the subsurface illumination unit preferably takes place through the object carrier unit, in particular, formed as an aluminum platen, and/or through a gap-filler, in particular, without an active fan. The object carrier unit preferably has a multilayered construction. The object carrier unit preferably includes at least one dispersion cover and at least one object support, which includes, in particular, the major surface of extension. The dispersion cover and at least one object support are preferably made of a translucent material, in particular, an acrylic resin sheet composite, such as Opal 5302 Hi Macs®. A surface of the translucent material is preferably ground. Together, the dispersion cover and the at least one object support form a maximum plate thickness of the object carrier unit of at least 12 mm. The major surface of extension of the object carrier unit preferably has a maximum spacing relative to the subsurface illumination unit, which is less than 50 mm, in particular, less than 40 mm, and particularly preferably, less than 30 mm, in particular, in an assembled state of the object carrier unit and the subsurface illumination unit. Voltage is preferably supplied to the illumination unit by, in particular, six power supply units, such as power supply units HEP600-20, 20V/28A of the company Mean Well, which are individually distributed, in particular, over a six-channel DMX controller, such as a six-channel DMX controller 6CV10A-TS. However, it is also possible for voltage to be supplied to the illumination unit in a different manner appearing useful to one skilled in the art. The DMX controller is preferably intended for driving the illumination element at a repetition rate of greater than 70 Hz, in particular, in order to achieve flicker-free light output of the illumination element. Preferably, the illumination unit may be adapted automatically to parameters of an object data acquisition unit with the aid of the DMX controller or the processing unit, as a function of an embodiment of the object data acquisition unit, in particular, to adjust a setting of, for example, a repetition rate of the illumination unit to a repetition rate of the object data acquisition unit, in order to preferably prevent, at least as much as possible, an image error, such as flickering or flashing, during recording.

The DMX controller is preferably set to a maximum current limit of 10 A. Preferably, the DMX controller is individually adjusted and matched singly to each illumination panel of the illumination unit, connected to the DMX controller; individual addressing preferably being stored in the C-bus system. All of the electronic components of the acquisition device are preferably in accordance with DIN EN 61347-2-13-2017-10. In particular, the illumination unit is checked for photobiological safety as described in EN 62471. Illumination of the object may advantageously be adjusted by the embodiment of the acquisition device according to the present invention. In particular, using color adaptation, a contrast of the contrast unit with an object resting on the object carrier unit may be maximized.

In addition, in an example embodiment of the present invention, a contrast unit is provided, which includes at least one light source, in particular, the background illumination unit. A light source is preferably attached to the side of the contrast unit facing away from the object carrier unit. It is also possible for a light source to be set into the contrast unit. Furthermore, a contrast unit is provided, which includes at least one light-emitting diode, in particular, at least one organic light-emitting diode. In particular, the at least one light-emitting diode is intended for allowing the contrast unit to be illuminated uniformly, in particular, in different, adjustable colors. Illumination of the object may advantageously be adjusted by the embodiment of the acquisition device according to the present invention. In particular, using color adaptation, a contrast of the contrast unit with an object resting on the object carrier unit may be maximized.

In addition, in accordance with an example embodiment of the present invention, a contrast unit is provided; the movement device including a drive unit for automated movement of the contrast unit. In particular, the drive unit is intended for moving the contrast unit on a path of motion around the object acquisition region. Preferably, the path of motion of the contrast unit is continuously joined to the path of motion of the object data acquisition unit. Alternatively, at least sections of the path of motion of the contrast unit run substantially parallelly to a path of motion of the object data acquisition unit. In this case, "substantially parallelly" is to be understood as, in particular, an orientation of a direction relative to a reference direction, in particular, in a plane; the direction deviating from the reference direction by, in particular, less than 8°, advantageously, less than 5°, and particularly advantageously, less than 2°. It is also possible for the path of motion of the contrast unit to be designed to be independent of the path of motion of the object data acquisition unit. In particular, "automated" is to be understood to mean that the drive unit is controlled and/or regulated by a, in particular, central, processing unit. In particular, the processing unit controls and/or regulates the drive unit in light of a list of perspectives, in particular, determined beforehand, from which the object is intended to be measured. The embodiment of the acquisition device according to the present invention may advantageously allow a background to be adapted, in particular, to a position of the object data acquisition unit.

In accordance with an example embodiment of the present invention, an example contrast unit is provided; the movement device including a movement unit, which is intended for simultaneously moving the contrast unit and the object data acquisition unit. "To move simultaneously" is to be understood to mean, in particular, that at least after completion of the movement, the contrast unit and the object data acquisition unit have the same relative position and the same relative orientation with respect to each other as prior to the movement. The movement of the contrast unit and the movement of the object data acquisition unit may take place simultaneously or may be carried out one after the other. It is also possible for the same relative position and the same relative orientation with respect to each other to be maintained during the entire movement. In particular, the contrast unit and the object data acquisition unit have a common swivel axis and/or axis of rotation, about which the object data acquisition unit and the contrast unit are pivoted and/or rotationally mounted. Through the embodiment of the acquisition device according to the present invention, a uniform background may be provided independently of the relative position of the object and the object data acquisition unit.

In addition, in accordance with an example embodiment of the present invention, an example contrast unit is provided; the movement unit including a structural element, which, in at least one operating state, interconnects the contrast unit and the object data acquisition unit substantially rigidly. "Substantially rigidly" is to be understood to mean, in particular, that a relative position and a relative orientation of the contrast unit and the object data acquisition unit with respect to each other are retained at least while a force is applied by the drive unit and/or while a torque is applied by the drive unit. The structural element preferably takes the form of a common guide block. Alternatively, or in addition, the structural element includes at least one, preferably two, coupling rods, which interconnect the movement unit of the object data acquisition unit and the movement unit of the contrast unit. The embodiment of the acquisition device according to the present invention may advantageously ensure, in a simple and reliable manner, that the contrast unit and the object data unit move simultaneously with respect to each other.

In addition, in accordance with an example embodiment of the present invention, an example control and/or regulating unit is provided, which is intended for setting at least one operating parameter of the acquisition device as a function of at least one object parameter. In particular, using the operating parameters, the control and/or regulating unit is intended for individually and continuously adjusting all of the sequences of movements to each other, which are allowed by the movement device. An object parameter is, in particular, an individual information item regarding an object and/or an instruction for an object. This information item and/or instruction may be a function of the object itself and/or conditional upon the situation. An object parameter may take the form of, for example, a maximum extension of the object, a weight, a relative configuration on the object carrier unit, and/or a degree of contamination. An operating parameter of the acquisition device includes, for example, the perspectives to be used, the number of object data, which a set of multiple object data includes, the rotational speed of the object carrier unit, the activation of the treatment unit, the speed of the transport unit, the power of an air compressor and/or another parameter appearing useful to one skilled in the art, which may be adapted for reliably acquiring a set of multiple object data. The example embodiment of the acquisition device according to the present invention may advantageous allow reliable acquisition of a set of multiple object data to be achieved. In particular, the acquisition device may be adapted rapidly and reliably to objects having different object parameters.

In addition, in accordance with an example embodiment of the present invention, an identification unit for acquiring at least one object parameter in advance is provided. The identification unit preferably includes a scanning unit for reading in an object parameter. The object parameter preferably takes the form of a unique identification number, such as an EAN. The identification number is preferably stored in an identification element, for example, in the form of a bar code, QR code and/or RFID tag. The identification number is preferably read in during the loading of the transport unit and/or during positioning of the object in the object measuring region. With the aid of the identification number, further object parameters, such as dimensions and/or weight, may preferably be retrieved from a database. The identification number is preferably injective. As an alternative, the identification number associates an object with a particular category of objects having similar, further object parameters. The scanning unit is preferably a handheld scanner. In a further refinement of the present invention, the scanning unit could also be integrated in the object carrier, the transport unit and/or the lock chamber unit, in particular, for automated acquisition of an object parameter. The identification element is preferably situated on the object and/or integrated in the object. However, it is also possible for the identification feature to be positioned so as to be spatially separated from the object, for example, packaging and/or a data sheet. The example embodiment of the acquisition device according to the present invention may allow operating parameters of the acquisition device to be adjusted rapidly to different objects. It is advantageous that acquired sets of multiple object data may be assigned reliably to an object.

In addition, in accordance with an example embodiment of the present invention, an identification unit for acquiring at least one object carrier parameter in advance is provided. The identification unit preferably includes a scanning unit for reading in an object carrier parameter. The object carrier parameter preferably takes the form of a unique identification number. The identification number is preferably stored in an identification element, for example, in the form of a bar code, QR code and/or RFID tag. The identification number is preferably read in during the loading of the transport unit and/or during positioning of the object on the object carrier. The identification unit preferably includes a further scanning unit for reading in the identification number immediately prior to positioning the object carrier in the object measuring region.

The identification number is preferably injective. It is, in particular, serial numbering. The scanning unit is preferably a handheld scanner. The further scanning unit is preferably designed to be automated. The embodiment of the acquisition device according to the present invention may allow operating parameters of the acquisition device to be adapted rapidly to different object carriers.

In addition, in accordance with an example embodiment of the present invention, it is provided that the identification unit be intended for evaluating an object carrier parameter with regard to an object parameter. The identification unit preferably includes a scanning unit, which allows both an object parameter, in particular, an identification number, and an object carrier parameter, in particular, an identification number, to be read in. In the identification unit, an object carrier parameter is preferably assigned to an object in light of an object parameter. Preferably, with the aid of the object carrier parameter, further object parameters, such as dimensions and/or weight, may preferably be retrieved from a database. In particular, in the case of objects having very different object parameters, acquisition of object parameters in advance in a simple manner may be ensured by the example embodiment of the acquisition device according to the present invention.

Furthermore, in accordance with an example embodiment of the present invention, a communications device for receiving object parameters is provided. In particular, the acquisition device includes an interface for communication with storage and/or logistics software, in order to receive and/or compare object parameters rapidly and reliably. Faulty assignments may be detected by the embodiment of the acquisition device according to the present invention.

In addition, in accordance with an example embodiment of the present invention, it is provided that the object carrier unit includes a weight measuring unit. A "weight measuring unit" is to be understood as, in particular, a unit, which may measure at least a weight, preferably, a mass, of an object. For example, the weight measuring unit may be set into the object carrier in the form of a pressure plate. Alternatively, the weight measuring unit measures a weight, using the forces and/or torques on the bearing unit. Through the embodiment of the acquisition device according to the present invention, a set of multiple object data may also contain an information item about the weight of the measured object.

In addition, in accordance with an example embodiment of the present invention, an dimension measuring unit is provided. A "dimension measuring unit" is to be understood as, in particular, a unit, which may measure at least an extension of an object. The dimension measuring unit preferably includes a movably supported laser module for a time-of-flight measurement. In this context, the laser module may be connected to the movement unit of the object data acquisition unit and/or to the contrast unit in a form-locked and/or force-locked manner. Alternatively, the movement device includes a laser-module movement unit for moving the laser module independently of the object data acquisition unit. The laser-module movement unit preferably includes a guide block. The guide block is preferably situated on the guide unit of the object data acquisition device and/or on the guide unit of the contrast unit. Alternatively, the laser-module movement unit has a path of motion independent of the object data acquisition device and/or of the contrast unit. In an alternative embodiment, an extension of an object is calculated by a processing unit with the aid of the set of multiple object data acquired by the object data acquisition unit and movement data of the object carrier unit, in particular, a rotational speed, using a structure-from-motion method. It is also possible for the "dimension measuring unit" to include an illumination unit and a detection unit, in order to obtain an extension from a transmitted-light and/or incident-light method. It is also possible for a plurality of methods to be combined with each other. Through the example embodiment of the acquisition device according to the present invention, a set of multiple object data may also contain an information item about the dimensions of the measured object.

In addition, in accordance with an example embodiment of the present invention, a penetrating-radiation unit, in particular, an x-ray unit, is provided, which is intended for transmitting radiation at least partially through at least one object. The penetrating-radiation unit preferably includes at least one x-ray unit and an x-ray screen. Alternatively, and/or in addition, the penetrating-radiation unit includes an ultrasonic unit. In this context, the irradiation unit may be connected to the movement unit of the object data acquisition unit and/or to the contrast unit in a form-locked and/or force-locked manner. As an alternative, the movement device includes a penetrating-radiation movement unit for moving the penetrating-radiation unit independently of the object data acquisition unit and/or of the contrast unit. The penetrating-radiation movement unit preferably includes a guide block. The guide block is preferably situated on the guide unit of the object data acquisition device and/or on the guide unit of the contrast unit. Alternatively, the penetrating-radiation movement unit has a path of motion independent of the object data acquisition device and/or of the contrast unit. It is also possible for the penetrating-radiation movement unit to be stationary. The example embodiment of the acquisition device according to the present invention may allow a set of multiple object data to also contain an information item about the internal structure of an object. In particular, it may be discerned whether the object is hollow or solid. Using data about the dimensions, a density may additionally be deduced.

Further provided, in accordance with an example embodiment of the present invention, is a system having an acquisition device according to the present invention; having a storage unit that includes data sets at least partially generated by the acquisition device; and having a mobile acquisition unit; as well as having a processing unit, which is intended for evaluating data acquired by the mobile acquisition unit in view of at least the storage unit. The storage unit is preferably intended for storing sets of multiple object data at least temporarily. With regard to an adjusted setting of the acquisition device during the acquisition, the sets of object data of objects, generated by the system or by the acquisition device, preferably include a dimension of the object, a weight of the object, a bounding box of the object, a volume model of the object, 3-D data of the object, color profiling of the acquisition device, or further data appearing useful to one skilled in the art. The sets of object data of measured objects are preferably stored as so-called metadata, in particular, in accordance with Exif (exchangeable image file format), in the image files of the measured objects. However, it is also possible for the sets of object data of measured objects to be stored in a different manner, such as in a separate file format, as an electronic watermark, separately from the image file in a database or the like. It is possible for the acquisition device or the system including the acquisition device to have one or more scales, with the aid of which at least one parameter taking the form of a weight is measurable. The one or more scales is/are preferably connected to the processing unit so as to be able to at least transfer data. It is particularly preferable for the storage unit to be intended for storing data sets, which have been generated at least partially by the acquisition device. The storage unit is preferably formed so as to be spatially separate from the acquisition device. The processing unit is intended for executing an object learning operation. An "object learning operation" is to be understood as, in particular, processing of the sets of multiple object data for an additional application. For example, an object learning operation may include the generation of a panoramic view of the object, the generation of a three-dimensional model of the object and/or the extraction of characteristic features, in particular, to allow pattern recognition. The sets of multiple data generated by the acquisition device are preferably processed to form sets of data, which have been generated at least partially by the acquisition device. "Generated at least partially by the acquisition device" is to be understood to mean, in particular, that at least one further information item is utilized for processing a set of multiple data. The further information item is preferably a further set of multiple data of a further object, which, with regard to at least a type of object data, may be put in the same category as the object. A "mobile acquisition unit" is to be understood to mean that, in particular, in a provided operating state, the mobile acquisition unit is portable by hand, in particular, operable independent of location. Preferably, the mobile input unit may be worn by a person directly or indirectly on the body, for example, as an armband and/or in a pocket of a piece of clothing. For example, the mobile input unit may take the form of a smartphone, tablet, smartwatch, and/or as a peripheral head-mounted display (PHMD). The mobile acquisition unit is intended, in particular, for acquiring object data. In addition, the mobile input unit includes a communications unit for communication with the processing unit. The processing unit is intended for identifying the object with the aid of the object data acquired by the mobile acquisition unit, in view of the data sets stored in the storage unit. It is also possible for the processing unit to be intended for identifying the object with the aid of the sets of multiple object data acquired by the acquisition device, in view of the data sets stored in the storage unit. Using the embodiment of the system according to the present invention, a database, which allows an object to be identified by simple devices, may be generated. In particular, additional data regarding the object may be retrieved immediately.

Furthermore, an example method for acquiring sets of multiple object data of the least one object, using an acquisition device of the present invention, and/or a system of the present invention, is provided.

In addition, an example method utilizing an acquisition device according to the present invention and/or a system according to the present invention is provided, in which in at least one method step, the object carrier unit and the object data acquisition unit are moved in directions opposite to each other, in particular, about a swivel axis and/or axis of rotation of a bearing unit of the movement device. The embodiment of the method according to the present invention may allow an idle time of the acquisition device to be kept as low as possible in an advantageous manner.

Moreover, an example method utilizing an acquisition device according to the present invention and/or a system according to the present invention is provided, in which in at least one method step, at least one set of multiple data is ascertained during a return movement of the movement device back to a starting position of the movement device, after a forward movement. The movement device and the object data acquisition unit are preferably controlled and/or regulated by a, in particular, central, processing unit. In particular, the processing unit controls and/or regulates the defined, relative movement and at least the acquisition time of the object data acquisition unit. The movement device preferably has a defined starting position, from which a defined, relative movement starts. A "forward movement" is to be understood as, in particular, a movement, which leads away from the starting position. A "return movement" is to be understood as, in particular, a movement, which leads to the starting position. A return movement may be carried out by reversing the path of motion during a forward movement, or by moving further along a closed path of motion. The embodiment of the method according to the present invention may allow an idle time of the machine for restoring the starting position of the movement device between two acquisitions of different sets of multiple object data, to be minimized in an advantageous manner.

In addition, an example method utilizing an acquisition device of the present invention and/or a system of the present invention is provided, in which in at least one method step, a material is deduced from at least one data set. Preferably, the processing unit deduces a material from at least color and weight of the object, by comparison with a database. For identifying a material, dimensions of the object are preferably utilized, in particular, an information item regarding the density. It is possible for further data regarding a material of the object to be ascertained, using, for example, laser spectroscopy. In particular, objects appearing identical may be distinguished from each other by the embodiment of the method according to the present invention.

In addition, an example method utilizing a system according to the present invention is provided, in which in an at least one method step, the generated sets of object data are evaluated for machine learning, in particular, by a neural network. Furthermore, a method utilizing a system according to the present invention is provided, in which in an at least one method step, the generated sets of object data are evaluated for identifying the object. In addition, a method utilizing a system according to the present invention is provided, in which in an at least one method step, the data acquired by the mobile acquisition unit are evaluated for identifying the object. Using the embodiment of the method according to the present invention, in particular, a measured object may be identified rapidly and reliably.

In this connection, the acquisition device of the present invention, the system of the present invention, and/or the method of the present invention shall not be limited to the use and specific embodiment described above. In particular, in order to achieve a functionality described here, the acquisition device of the present invention, the system of the present invention, and/or the method of the present invention may have a number of individual elements, component parts and units, as well as method steps, different from a number mentioned here. In addition, in the ranges of values indicated in this description, values lying within the above-mentioned limits are also to be acknowledged as described and as arbitrarily applicable.

BRIEF DESCRIPTION OF THE DRAWINGS

Further advantages are derived from the description of the figures that follows. Nine exemplary embodiments of the present invention are shown in the figures. The figures and the description herein include numerous features in combination. One skilled in the art will necessarily consider the features individually, as well, and unite them to form useful, further combinations.

DETAILED DESCRIPTION OF EXAMPLE EMBODIMENTS

Figure 1:
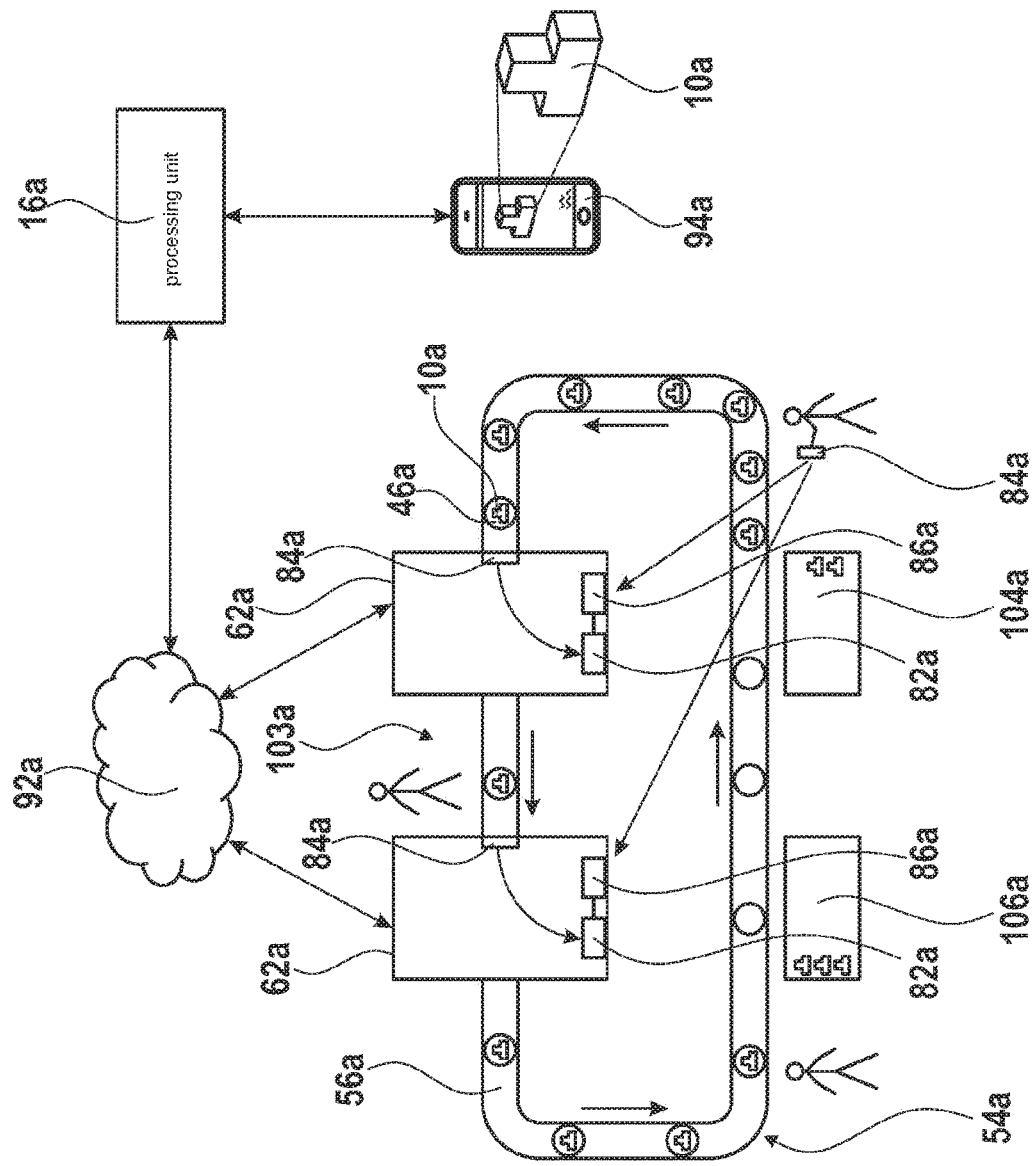
FIG. 1 shows a schematic representation of the system according to the present invention, for nontransparent object carriers.

FIG. 1 shows a system including an acquisition device, having a storage unit 92a that has data sets at least partially generated by the acquisition device, and having a mobile acquisition unit 94a, as well as having a processing unit 16a which is intended for evaluating data acquired by mobile acquisition unit 94a in view of at least the storage unit 92a. The acquisition device includes a processing unit 16a, which is intended for carrying out an object learning operation.

The acquisition device includes a housing unit 62a, which is intended for shielding an object measuring region at least partially from the outside. The acquisition device includes a transport unit 54a, which is intended for feeding objects 10a to the object measuring region in an at least semiautomated manner. Transport unit 54a includes a path conveyor unit 56a, in particular, a conveyor belt unit. Transport unit 54a is intended for transporting at least two detachably connected object carriers 46a. Transport unit 54a preferably transports a plurality of object carriers 46a, although a number of object carriers 46a shown is preferably just illustrative. In particular, in a loading region 104a, object carriers 46a are each loaded with one object 10a. After being measured in object measuring regions surrounded by housing units 62a, objects 10a are preferably removed from object carriers 46a in an unloading region 106a. The loading and/or unloading takes place manually, for example, such as, in particular, by a worker. In one further refinement, the loading and/or unloading of transport unit 54a may also be accomplished automatically, in particular, with the aid of a logistics and conveyance unit, such as with the aid of a robot.

The acquisition device includes an identification unit 84a for acquiring object parameters in advance. The acquisition device includes an identification unit 84a for acquiring object parameters in advance. In particular, identification unit 84a includes, in each instance, a scanning unit, which is situated on housing units 62a. Identification unit 84a preferably includes a mobile scanning unit. The mobile scanning unit is intended, in particular, for acquiring both an object parameter and an object carrier parameter. In particular, the mobile scanning unit reads in an identification number of object carrier 46a in response to the loading of object carrier 46a. Subsequently, and/or beforehand, the mobile scanning unit preferably reads in an identification number of object 10a. However, it would also be possible for an identification number of object 10a to be assigned manually to the one identification number of object carrier 46a and to merely be checked by the scanning unit. Object parameters are preferably extracted from an internal and/or external database in light of the identification number of object 10a. The acquisition device includes a communications device 86a for receiving object parameters. In addition to the object parameters, communications device 86a receives, in particular, the identification number of the object carrier 46a, which carries corresponding object 10a. After the identification numbers are read in, path conveyor unit 56a preferably transports object 10a on object carrier 46a to the first object data acquisition region. Identification unit 84a is intended for evaluating an object carrier parameter with regard to an object parameter. In particular, the scanning unit situated on housing unit 62a acquires the identification number of object carrier 46a upon entry into the interior chamber of housing unit 62a. In particular, the object parameters received by communications device 86a are selected in view of the identification number of object carrier 46a. The acquisition device includes a control and/or regulating unit 82a, which is intended for setting at least one operating parameter of the acquisition device as a function of at least one object parameter.

In one embodiment having nontransparent object carriers 46a, in order to measure the side, facing object carrier 46a, of an object 10a resting on object carrier 46a, the object is turned 103a at least once. In order to achieve higher throughputs, the system includes a further object measuring region, which is intended for generating an additional measurement of object 10a after the turning 103a of object 10a. In particular, the object measuring regions are configured identically. However, it would also be possible for a second object measuring region to have a functionality reduced in comparison with the first object measuring region.

Figure 2:
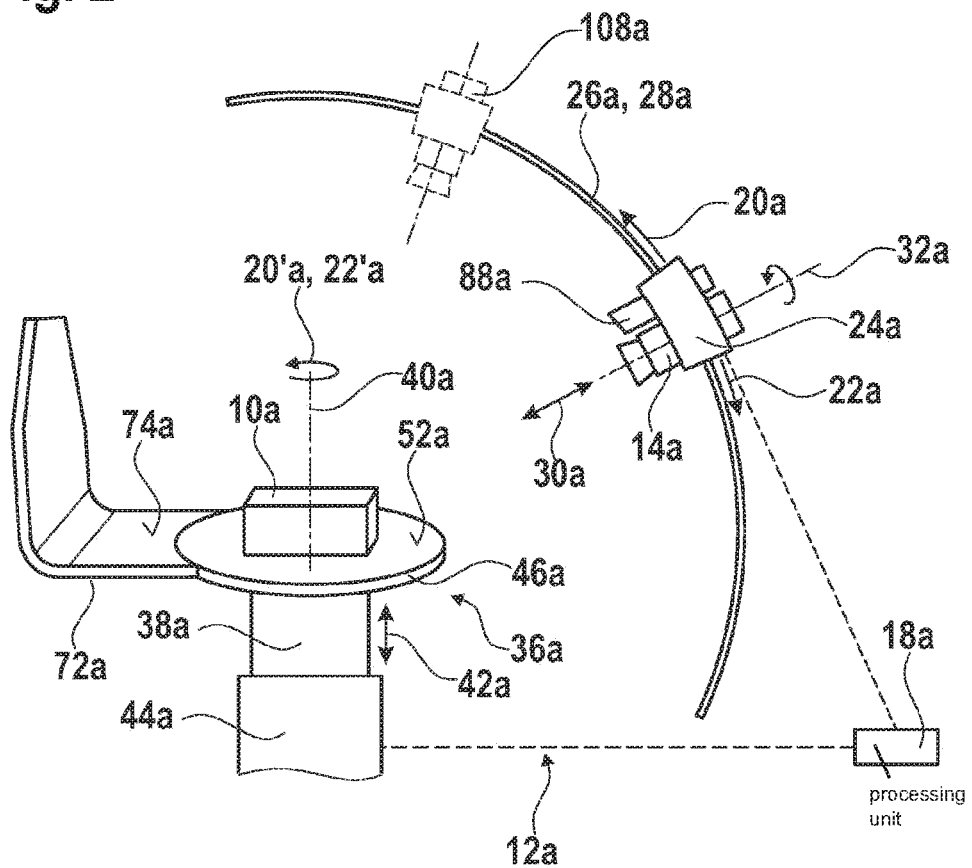
FIG. 2 shows a schematic representation of the movement device, including a nontransparent object carrier.

FIG. 2 shows the acquisition device for at least semiautomated acquisition of sets of multiple object data of at least object 10a, including a movement device 12a for generating a defined, relative movement between at least one object data acquisition unit 14a and the at least one object 10a. Movement device 12a is intended for acquiring object data from multiple perspectives.

Movement device 12a has at least one movement unit 24a for a defined movement of the at least one object data acquisition unit 14a. Movement unit 24a is intended for guiding the at least one object data acquisition unit 14a on an at least partially curved path of motion 26a. Movement unit 24a has at least one partially curved track 28a, and is intended for guiding the at least one object data acquisition unit 14a along the at least partially curved path 28. It is possible for a plurality of object data acquisition units 14a to be used. A further object data acquisition unit 108a is indicated in FIG. 2. In particular, in order to acquire object data from multiple perspectives in a more rapid manner, each object data acquisition unit 14a, 108a could cover a subsection of curved track 28a. In particular, object data acquisition units 14a, 108a could be moved simultaneously or independently of each other. Movement unit 24a is intended for guiding the at least one object data acquisition unit 14a along a direction 30a at least substantially perpendicular to a path of motion 26a. Object data acquisition unit 14a includes at least one swivel axis and/or axis of rotation 32a, about which object data acquisition unit 14a is pivoted and/or rotationally mounted. The acquisition device includes a dimension-measuring unit 88a. Dimension-measuring unit 88a preferably takes the form of a laser module. Dimension-measuring unit 88a is preferably mounted with object data acquisition unit 14a on a common guide block of movement unit 24a.

The acquisition device includes an object carrier unit 36a. Movement device 12a includes a bearing unit 38a, by which object carrier unit 36a is movably supported. Bearing unit 38a includes at least one swivel axis and/or axis of rotation 40a, about which object carrier unit 36a is pivoted and/or rotationally mounted. Bearing unit 38a has at least one path of motion 42a, along which object carrier unit 36a is movably supported. Object carrier unit 36a is preferably supported by bearing unit 38a so as to be movable relative to object data acquisition unit 14a, in particular, supported so as to be able to rotate3. Movement device 12a includes a drive unit 44a, which is intended for moving object carrier unit 36a in an automated manner. Movement device 12a preferably includes drive unit 44a, which is intended for moving object carrier unit 36a and object data acquisition unit 14a in directions opposite to each other, in particular, contrarotationally about swivel axis and/or axis of rotation 40a of bearing unit 38a.

Object carrier unit 36a is provided for active illumination. Object carrier unit 36a has at least one light source 52a. Object carrier unit 36a includes at least one light-emitting diode (LED), in particular, at least one organic light-emitting diode (OLED). Light source 52a preferably includes an OLED screen, which is positioned flat on object carrier 46a. The object carrier unit preferably includes at least one transparent protective layer for protecting light source 52a.

Object carrier unit 36a includes a weight-measuring unit. Object carrier unit 36a includes at least one detachably connected object carrier 46a. To acquire object data, object carrier 46a is preferably raised from path conveyor unit 56a (cf. FIG. 1) by bearing unit 38a. After the acquisition of object data, object carrier 46a is preferably lowered by bearing unit 38a onto path conveyor unit 56a. For raising and lowering object carrier 46a, path conveyor unit 56a preferably includes a suitable recess, through which bearing unit 38a may be connected temporarily to object carrier 46a in a form-locked and/or force-locked manner.

The acquisition device includes a processing unit 18a, which is intended for utilizing a forward movement 20a, 20'a and return movement 22a, 22'a of an object data acquisition unit 14a and/or of an object 10a for data acquisition.

The acquisition device includes a contrast unit 72a, which is provided for active illumination. The acquisition device includes a contrast unit 72a, which has at least one light source 74a. The acquisition device includes a contrast unit 72a, which has at least one light-emitting diode, in particular, at least one organic light-emitting diode. In at least one operating state, contrast unit 72a is preferably positioned on object carrier unit 36a. Light source 74a preferably includes an OLED screen, which is positioned flat on contrast unit 74a.

Figure 3:
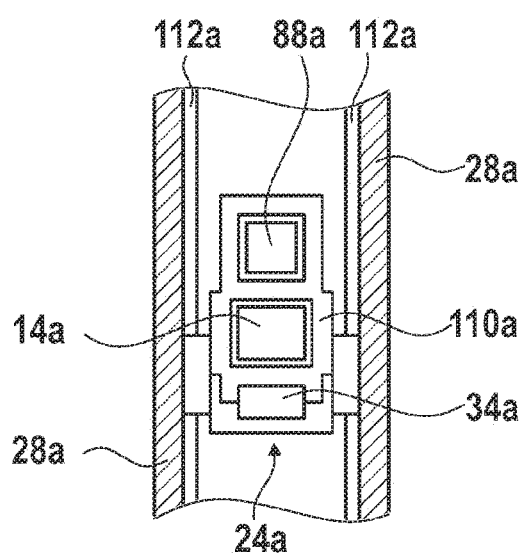
FIG. 3 shows a schematic representation of the movement unit of the object data acquisition unit.

FIG. 3 shows a possible embodiment of movement unit 24a. Movement unit 24a includes a drive unit 34a, which is intended for moving object data acquisition unit 14a in an automated manner. In particular, movement unit 24a has a guide block, on which object data acquisition unit 14a is mounted. Curved track 28a preferably takes the form of a guide rail having a guideway 112a. In particular, curved track 28a includes two tracks running in parallel. The guide block is preferably situated between the two tracks running in parallel.

Figure 12:
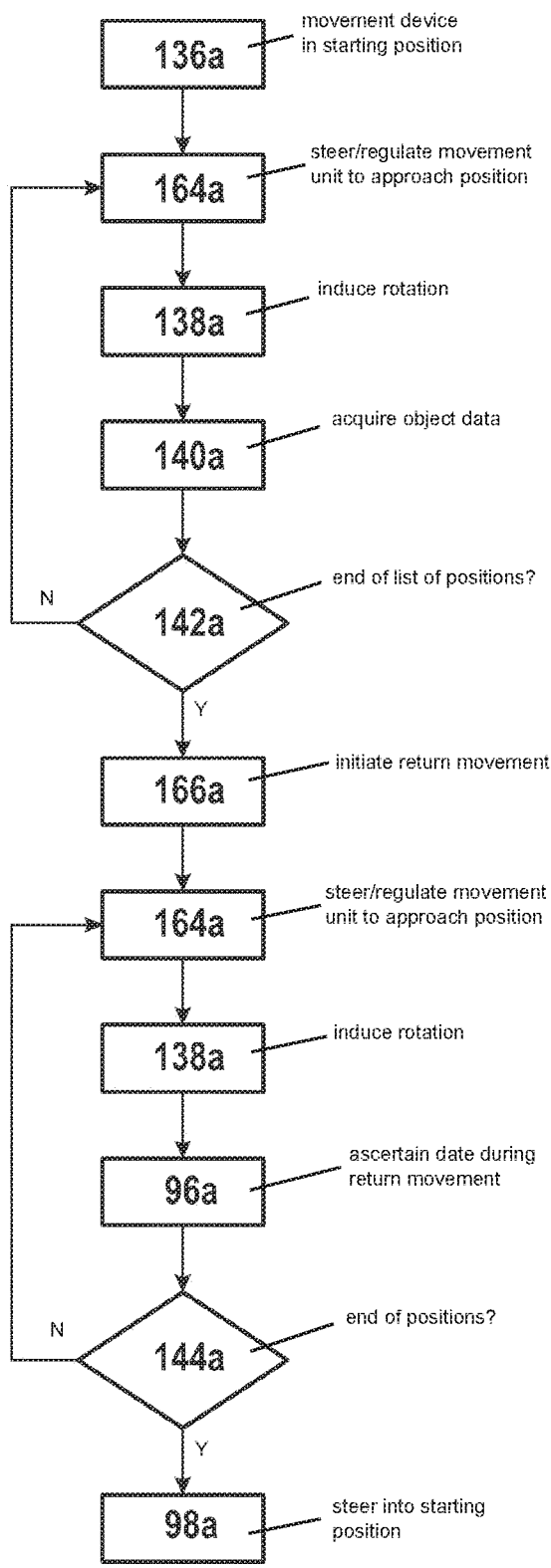
FIG. 12 shows a schematic representation of the method for acquiring a set of multiple object data.
Figure 13:
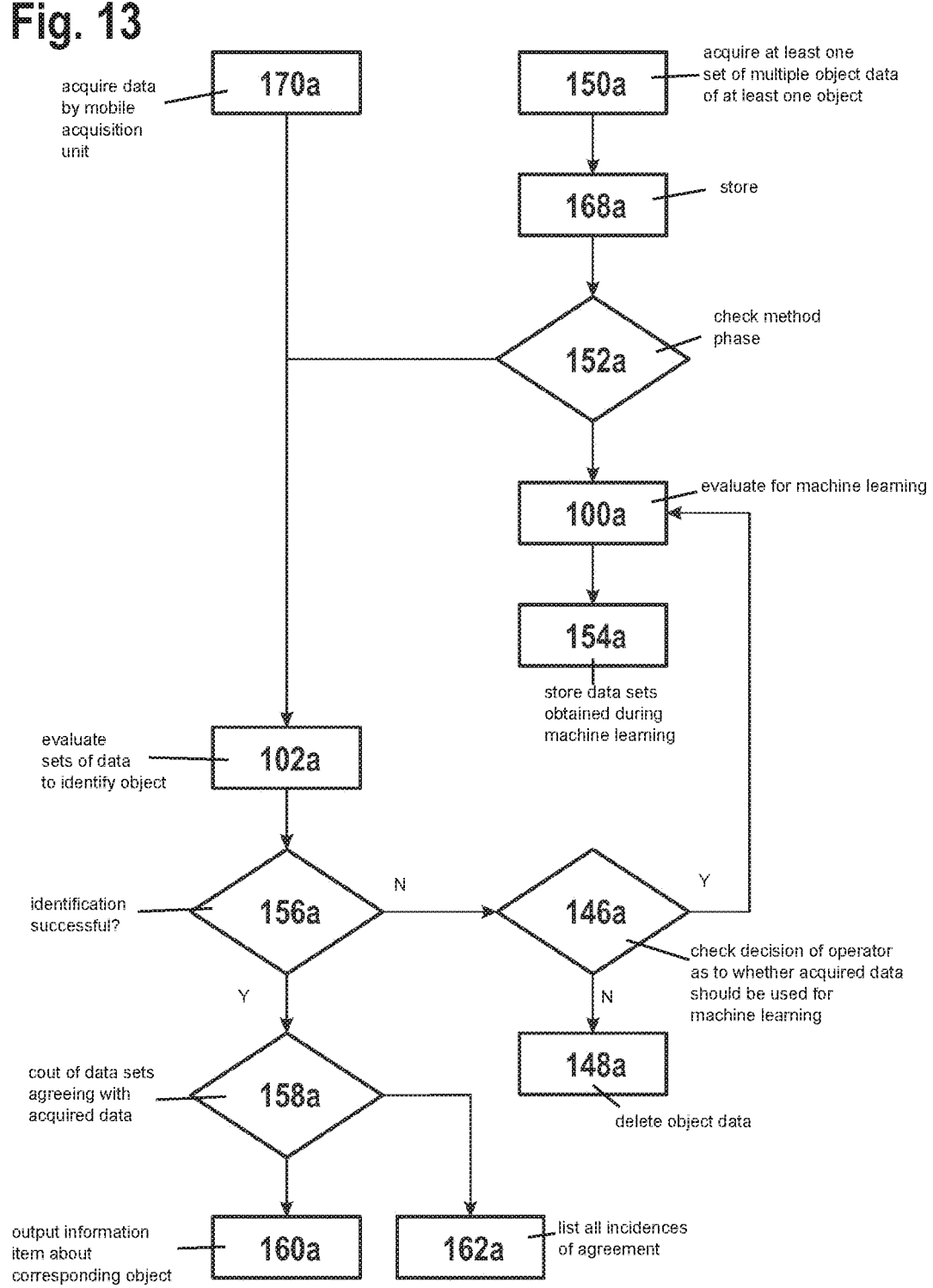
FIG. 13 shows a schematic representation of the method for identifying objects.

FIGS. 12 and 13 each show a method utilizing an acquisition device according to the present invention and/or a system according to the present invention.

FIG. 12 shows a schematic representation of the method for acquiring a set of multiple object data. In an initial phase 136a, it is preferably ensured that movement device 12a is in an intended starting position 98a. With the aid of the control and/or regulating units 82a, in particular, on the basis of a previous acquisition of object parameters, operating parameters for at least movement device 12a and object data acquisition unit 14a are preferably set automatically. In particular, a list of positions for object carrier unit 36a and object data acquisition unit 14a is generated, in which object data are acquired with the aid of object data acquisition unit 14a. In a further method step 164a, movement unit 24a of object data acquisition unit 14a is preferably steered to, and/or regulated so as to approach, the first position. In a further method step, or already while movement unit 24a is moved to a new position, object carrier unit 36a is preferably induced to rotate 138a uniformly about axis of rotation and/or swivel axis 40a with the aid of drive unit 44a. In a further method step 140a, object data are acquired by object data acquisition unit 14a at regular intervals, for example, every 10° of rotation of object carrier unit 36a. In particular, the individual acquisitions may be initiated, for example, with the aid of an angular displacement sensor, or they may take place in regular time intervals matched to an angular speed of object carrier unit 36a. In a further method step, after a, in particular, complete, rotation of object carrier unit 36a, a check 142a is preferably made as to whether an end of the list of positions has been reached. In response to a negative result of check 142a, movement unit 24a of object data acquisition unit 14a is preferably steered to, and/or regulated so as to approach, the next position. In response to a positive result of check 142a, in a further method step 166a, a return movement 22a is preferably initiated. In the method, in at least one method step 96a, at least one set of multiple data is ascertained during a return movement 22a of movement device 12a back into a starting position 98a of movement device 12a, after a forward movement 20a. In particular, a further list of positions for a return movement 22a is dealt with in an analogous manner. If an end of the further list of positions is reached during a corresponding, further check 144a, movement device 12a is preferably steered into starting position 98a. A list preferably includes at least standard positions, for example, in the case of a circular path of the object data acquisition unit, 0°, 45° and 90° with respect to starting position 98a. A list preferably includes at least object-specific positions. It is also possible for all positions, among which a measurement takes place, to be distributed uniformly over all lists. In particular, after the acquisition of a data set in method step 96a, 140a, rotation 138a may be stopped or be maintained continually up to a return of movement device 12a to starting position 98a.

FIG. 13 shows a schematic representation of the method for detecting an object 10a. In particular, FIG. 13 shows a method utilizing a system according to the present invention, where in at least one method step, the sets of object data generated are evaluated for machine learning 100a. Two phases are preferably distinguished. In particular, a learning phase and an acquisition phase are differentiated. A check 152a as to which phase the method is in, is preferably carried out in at least one method step. In a first method step 150a, at least one set of multiple object data of at least one object 10a is preferably acquired by the acquisition device. In at least one method step, object carrier unit 36a and object data acquisition unit 14a are preferably moved in directions opposite to each other, in particular, about swivel axis and/or axis of rotation 40a of bearing unit 38a of movement device 12a, in particular, in order to acquire a set of multiple object data of at least one object 10a with the aid of the acquisition device. In a further method step 168a, the set of multiple object data is preferably stored in storage unit 92a. In the learning phase, the generated sets of object data are preferably evaluated for machine learning 100a in at least one method step. In a further method step 154a, the data sets obtained during machine learning 100a are preferably stored in storage unit 92a. In particular, the original sets of multiple object data may be deleted in method step 154a. After completion of the learning phase, the system may preferably be used for identifying objects 10a measured previously. Object data regarding an object 10a to be identified are preferably acquired by a mobile acquisition unit 94a. Alternatively, the acquisition device is used in method step 150a for acquiring object data. The object data are preferably supplied to processing unit 16a. In the method, the sets of object data generated are evaluated in at least one method step, in order to identify 102a object 10a. In the method, the data acquired by mobile acquisition unit 94a are evaluated in at least one method step, in order to identify 102a object 10a. In particular, it is checked if, after an evaluation by processing unit 16a, the sets of object data generated by the acquisition device in method step 150a and/or the data acquired by mobile acquisition unit 94a in method step 170a at least partially agree with the data sets generated in the learning phase. Preferably, two data sets partially agree, if one data set is a subset of the other. In a further method step 156a, it is preferably checked if identification 102a is successful, in particular, if at least one instance of agreement was able to be found. If the acquired object data are not brought into agreement with any object measured beforehand, then, in an optional step, a decision 146a of an operator is checked as to whether the acquired object data should be used for machine learning 100a, in order to expand the list of identifiable objects, and/or in order to modify the data set stored in the storage unit to form an object already known. In the case of a negative decision 146a, then, in a final method step 148a, the object data are deleted. After a successful identification 102a, then, in a further method step, a count 158a of the data sets agreeing with the acquired data is preferably carried out. In the case of a single instance of partial agreement, then, in a final method step 160a, an information item about the corresponding object, such as a name, an identification number, and/or an order number, is preferably outputted. In the case of a plurality of objects in question, then, in a method step 162a, a list of all incidences of agreement is preferably outputted.

Preferably, an information item is outputted, with the aid of which the objects may be distinguished. In at least one method step in the method, a material is deduced from at least one data set. During machine learning 100a and/or identification 102a, a material is preferably deduced. In the acquisition of a set of multiple object data in method step 150a, it is also possible for the acquisition device to already use at least one set of object data to deduce a material.

In FIGS. 4-6, 7-8, 9, 10, 11, 14, 15 and 16, in each instance, a further exemplary embodiment of the present invention is shown. The following description and the figures are limited mainly to the differences between the exemplary embodiments; with regard to identically designated components, in particular, with regard to components having the same reference characters, reference also being able to be made, in principle, to the figures and/or the description of the other exemplary embodiments, in particular, of FIGS. 1 through 3, as well as 12 and 13. In order to distinguish between the exemplary embodiments, the letter "a" follows the reference numerals of the exemplary embodiment in FIGS. 1 through 3, as well as 12 and 13. In the exemplary embodiments of FIGS. 4-6, 7-8, 9, 10, 11, 14, 15 and 16, the letter "a" is replaced by the letters "b" through "i."

Figure 4:
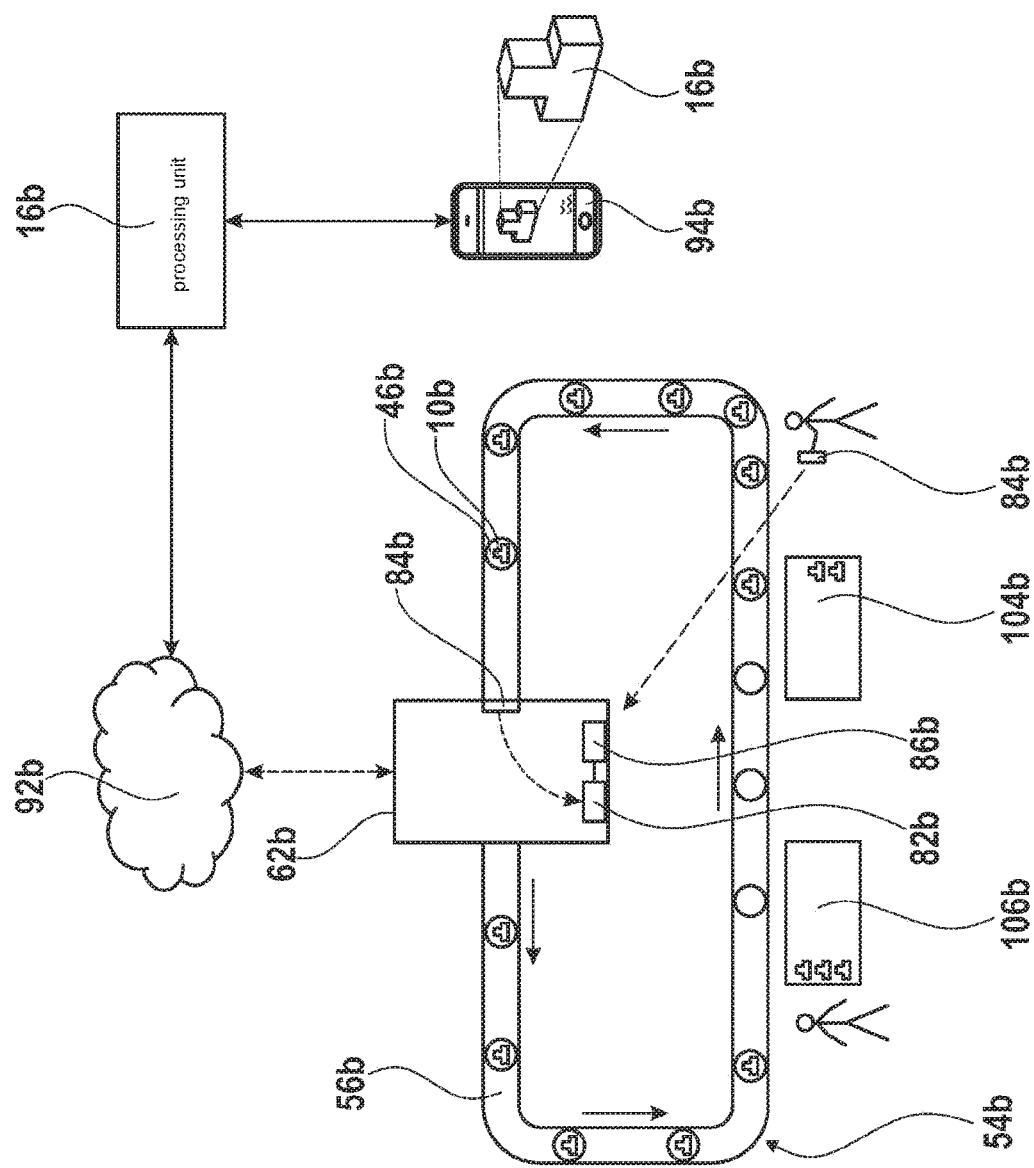
FIG. 4 shows a schematic representation of a system for transparent object carriers.

FIG. 4 shows a schematic representation of a system having a single object data acquisition region, which is surrounded by a housing unit 62b. In particular, by using an object carrier 46b having an object carrier wall 48b (cf. FIG. 5) that is transparent in at least one operating state, manual turning 103a (cf. FIG. 1) of the object may be omitted.

Figure 5:
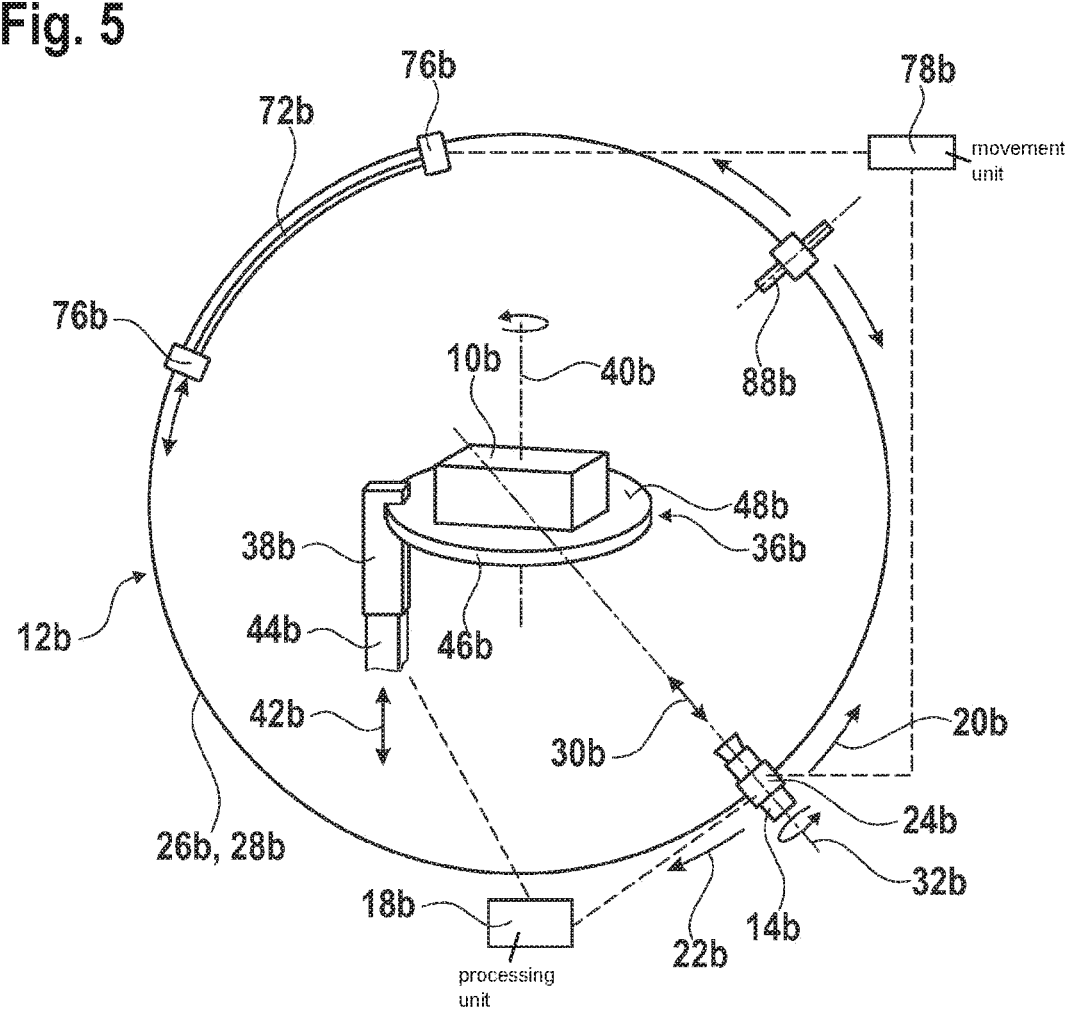
FIG. 5 shows a schematic representation of the movement device, including a nontransparent object carrier.
Figure 6:
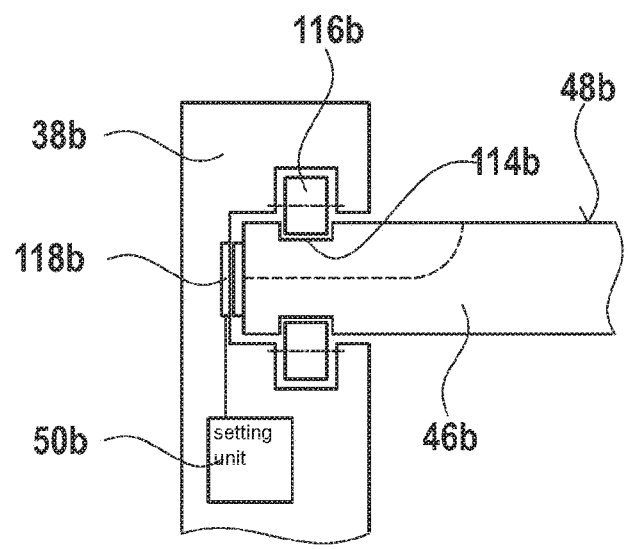
FIG. 6 shows a schematic representation of the bearing unit in the case of a lateral set-up.

FIG. 5 shows a schematic representation of movement device 12b, and FIG. 6 shows a schematic representation of bearing unit 38b. Object carrier unit 36b includes at least one object carrier 46b, which has an object carrier wall 48b that is transparent in at least one operating state. Object carrier unit 36b has a setting unit 50b, with the aid of which a reflectance, an absorbance, and/or transmittance is adjustable. Setting unit 50b is connected to object carrier wall 48b, in particular, via a friction contact 118b. The transparency of object carrier 46b preferably allows object data to be acquired from the side of object carrier 46b facing away from object 10b. To acquire a set of multiple object data, object 10b is preferably rotated 360° about swivel axis and/or axis of rotation 40b. Object data acquisition unit 14b is preferably moved along curved track 28b, at least on a circular arc having a center angle of 180°. Any desired perspective, that is, at least within a control and/or regulating accuracy of movement device 12b, may be assumed.

Bearing unit 38b is preferably situated to the side of object carrier unit 36b, in order not to block a line of sight of object data acquisition unit 14b to object 10b. Bearing unit 38b embraces object carrier unit 36b at least partially. Object carrier unit 36b includes, in particular, a groove 114b for receiving a rolling element 116b of bearing unit 38b. For example, groove 114b and rolling element 116b could also take the form of a rack-and-pinion drive. In particular, the axes of rotation of rolling element 116b are movably supported, in order to allow object carrier unit 36b to be stopped on/removed from bearing unit 38b.

The acquisition device includes a contrast unit 72b; movement device 12b having a drive unit 76b for moving contrast unit 72b in an automated manner. The acquisition device includes a contrast unit 72b; movement device 12b having a movement unit 78b, which is intended for simultaneously moving contrast unit 72b and object data acquisition unit 14b. In particular, movement unit 78b synchronizes drive units 76b and the drive unit of movement unit 24b, not shown in further detail. Processing unit 18b and movement unit 78b preferably take the form of a single, central processing unit.

A dimension-measuring unit 88b includes a movement unit, in particular, a guide block, independent of object data acquisition unit 14b.

Figure 7:
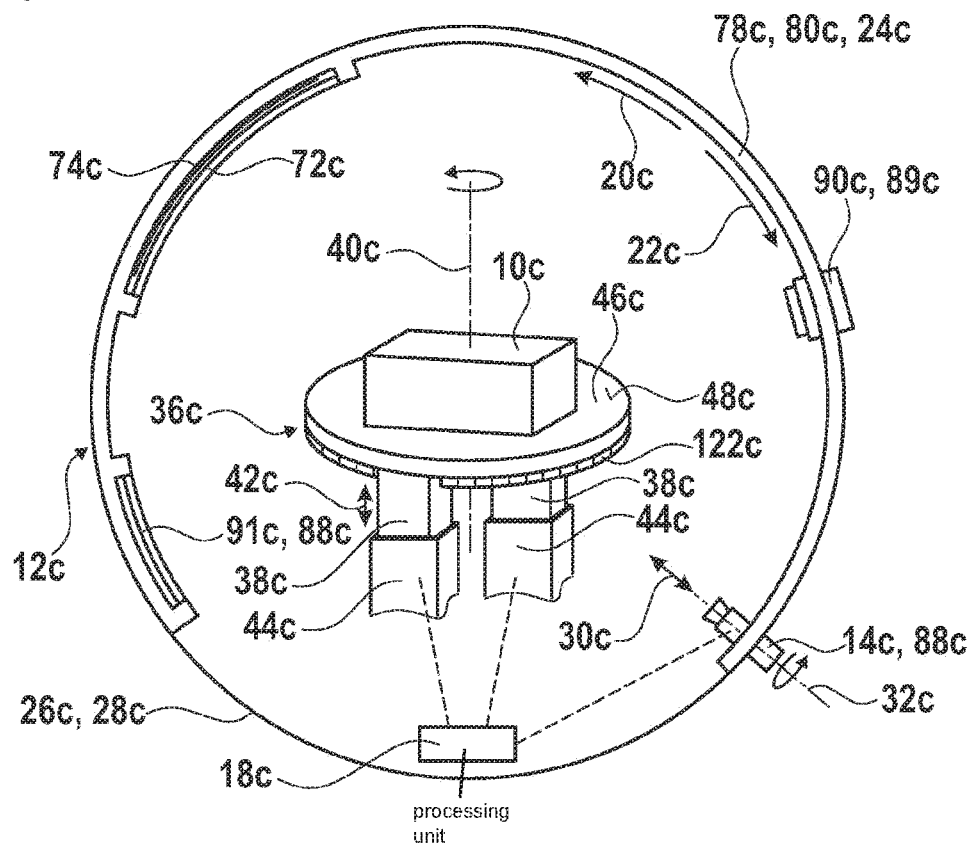
FIG. 7 shows a schematic representation of the movement device, including a structural element for simultaneously moving the object data acquisition unit and the contrast unit.

In FIG. 7, the acquisition device includes a contrast unit 72c; the movement unit 78c having a structural element 80c, which, in at least one operating state, interconnects contrast unit 72c and object data acquisition unit 14c substantially rigidly. In particular, structural element 80c takes the form of a common guide block. Contrast unit 72c is preferably intended for active illumination. In particular, viewed from object carrier unit 36c, a light source 74c is situated behind contrast unit 72c. The acquisition device includes a penetrating-radiation unit 89c, in particular, an x-ray unit, which is intended for transmitting radiation through at least one object 10c at least partially. Penetrating-radiation unit 89c preferably includes at least one radiation source 90c and a screen 91c. Penetrating-radiation unit 89c is preferably situated on movement unit 24c of object data acquisition unit 14c. Preferably, object data acquisition unit 14c is used simultaneously as a dimension-measuring unit 88c, in that sets of multiple object data are linked to, in particular, a speed of rotation of object carrier unit 36c about swivel axis and/or axis of rotation 40c.

Figure 8:
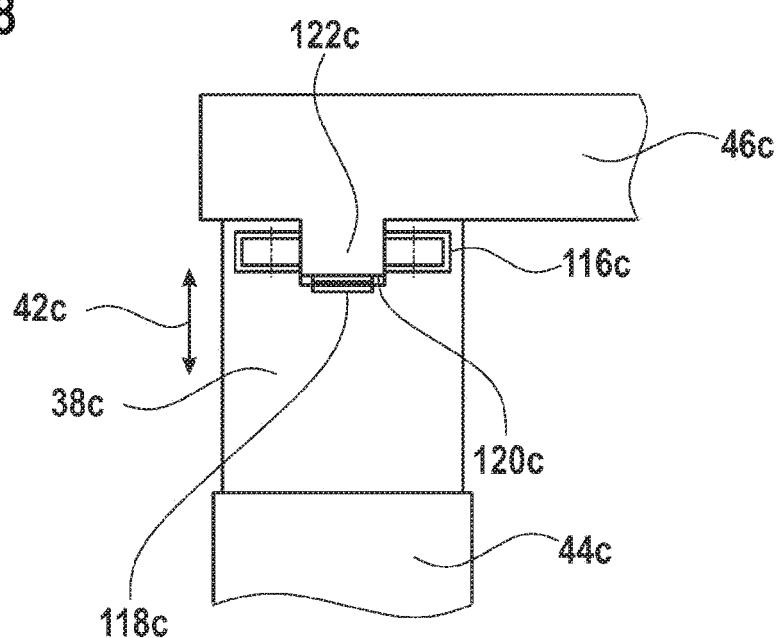
FIG. 8 shows a schematic representation of the bearing unit in the case of a lower-side set-up.

FIGS. 7 and 8 show schematic representations of bearing unit 38c. Bearing unit 38c is preferably formed in two pieces. Bearing unit 38c is intended for receiving a drive ring 122c situated on the side of object carrier unit 36c facing away from object 10c, in a groove 120c of the bearing unit.

Figure 9:
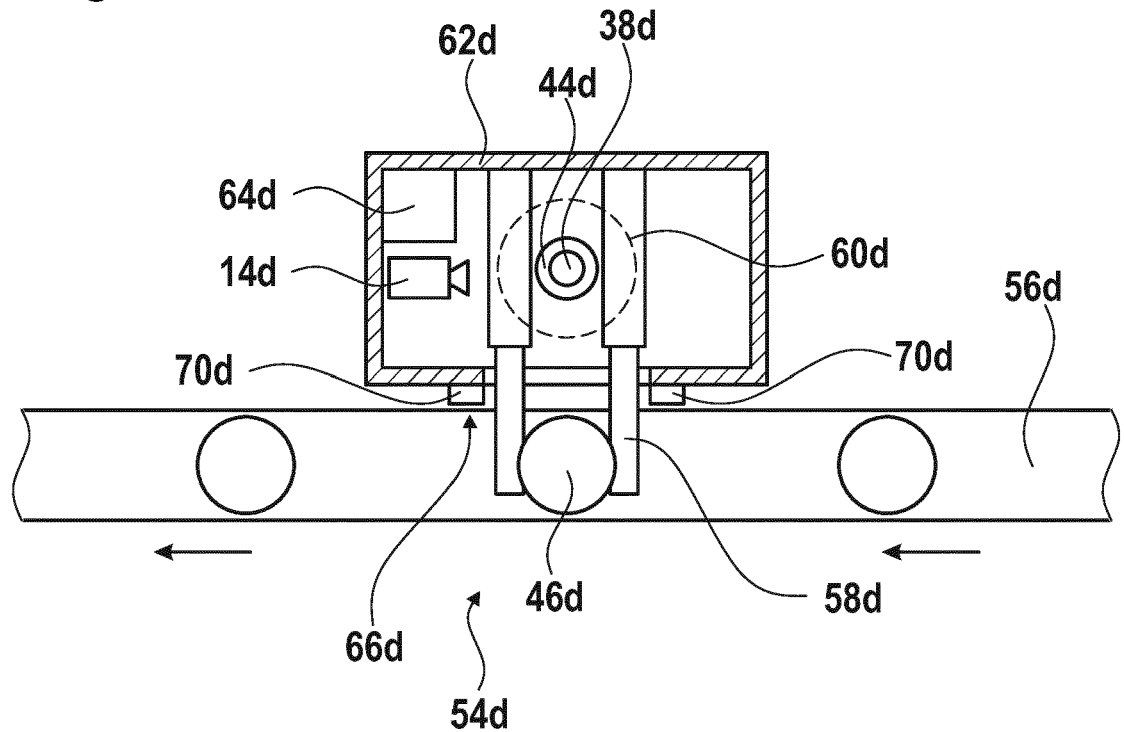
FIG. 9 shows a schematic representation of the transport unit and a positioning unit.

FIG. 9 shows an acquisition device, in which transport unit 54d is positioned to the side of housing unit 62d. Transport unit 54d includes a positioning unit 58d, in order to position an object, in particular, down from the path conveyor unit 56d, in an object measuring region 60d. In particular, positioning unit 58d takes the form of telescoping, gripping units, which are slid under an object carrier 46d on transport unit 54d. On the side facing path conveyor unit 56d, object carriers 46d preferably have a recess for receiving a gripping unit. In response to withdrawal of the gripping units, a connection of object carrier 46d with bearing unit 40d is preferably produced.

The acquisition device includes an anti-contamination unit 64d, which is intended for at least reducing contamination of an object measuring region 60d and/or of a region of an object data acquisition unit 14d, in particular, inside of housing unit 62d. Anti-contamination unit 64d is intended for generating a pressure above atmospheric inside of housing unit 62d. In particular, by positioning anti-contamination unit 64d behind object data acquisition unit 14d and/or behind object measuring region 60d, as viewed from the opening of housing unit 62d, a fluid stream is generated, which is directed from object data acquisition unit 14d and/or from object measuring region 60d to the opening of housing unit 62d. Intrusion of dust and/or other dirt particles is advantageously reduced. The acquisition device includes a treatment unit 66d, which is intended for treating, in particular, for cleaning, at least one object prior to acquisition of an object data set. Treatment unit 66d includes a fluid control unit 70d for controlling and/or regulating a fluid stream. In particular, the fluid control unit includes air nozzles. Fluid control unit 70d preferably generates an air stream, which is directed away from housing unit 62d. An airstream generated by fluid control unit 70d is preferably directed onto an object carrier 46d, which is situated in front of the opening of housing unit 62d. An airstream generated by fluid control unit 70d is intended for blowing away dust particles and other contamination, which are situated on object carrier 46d and/or on an object on object carrier 46d, in particular, in a direction opposite to housing unit 62d.

Figure 10:
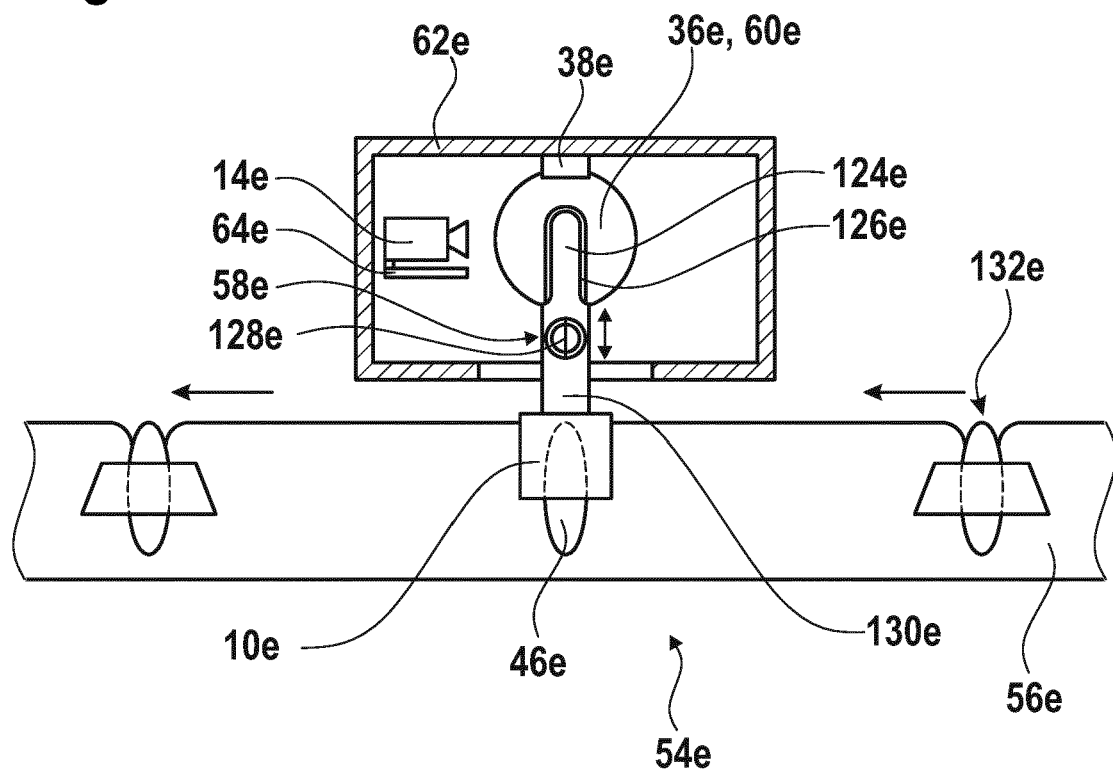
FIG. 10 shows a schematic representation of the transport unit and a further positioning unit.

FIG. 10 shows an acquisition device, in which transport unit 54e is positioned to the side of housing unit 62e. Transport unit 54e includes a positioning unit 58e, in order to position an object, in particular, down from the path conveyor unit 56e, in an object measuring region 60e. In particular, positioning unit 58e includes a magnetic foot 128e, which is movably supported in a guideway 130e. Magnetic foot 128e preferably has an electromagnet for switching the magnetic force. As an alternative, the magnetic foot includes a permanent magnet. Preferably, magnetic foot 128e is slid automatically under an object carrier 46e on path conveyor unit 56e. Path conveyor unit 56e preferably includes a recess 132e, via which magnetic foot 128e produces a force-locked connection to object carrier 46e. Object carrier 46e is preferably guided through recess 132e of path conveyor unit 56e to object carrier unit 36e. Object carrier unit 36e preferably has a counterpart complementary to object carrier 46e. In particular, in at least one intended operating state, the counterpart and object carrier 36e complement each other to form a substantially circular disk. In particular, object carrier unit 36e includes a recess 124e, which essentially takes the form of a negative shape of object carrier 46e. In particular, recess 124e has an offset 126e from a rack of object carrier 46e. The acquisition device includes an anti-contamination unit 64e, which is intended for at least reducing contamination of a region of an object data acquisition unit 14e, in particular, inside of housing unit 62e. In particular, anti-contamination unit 64e takes the form of an air nozzle. In particular, anti-contamination unit 64e generates a constant air stream, which is directed away from object data acquisition unit 14e.

Figure 11:
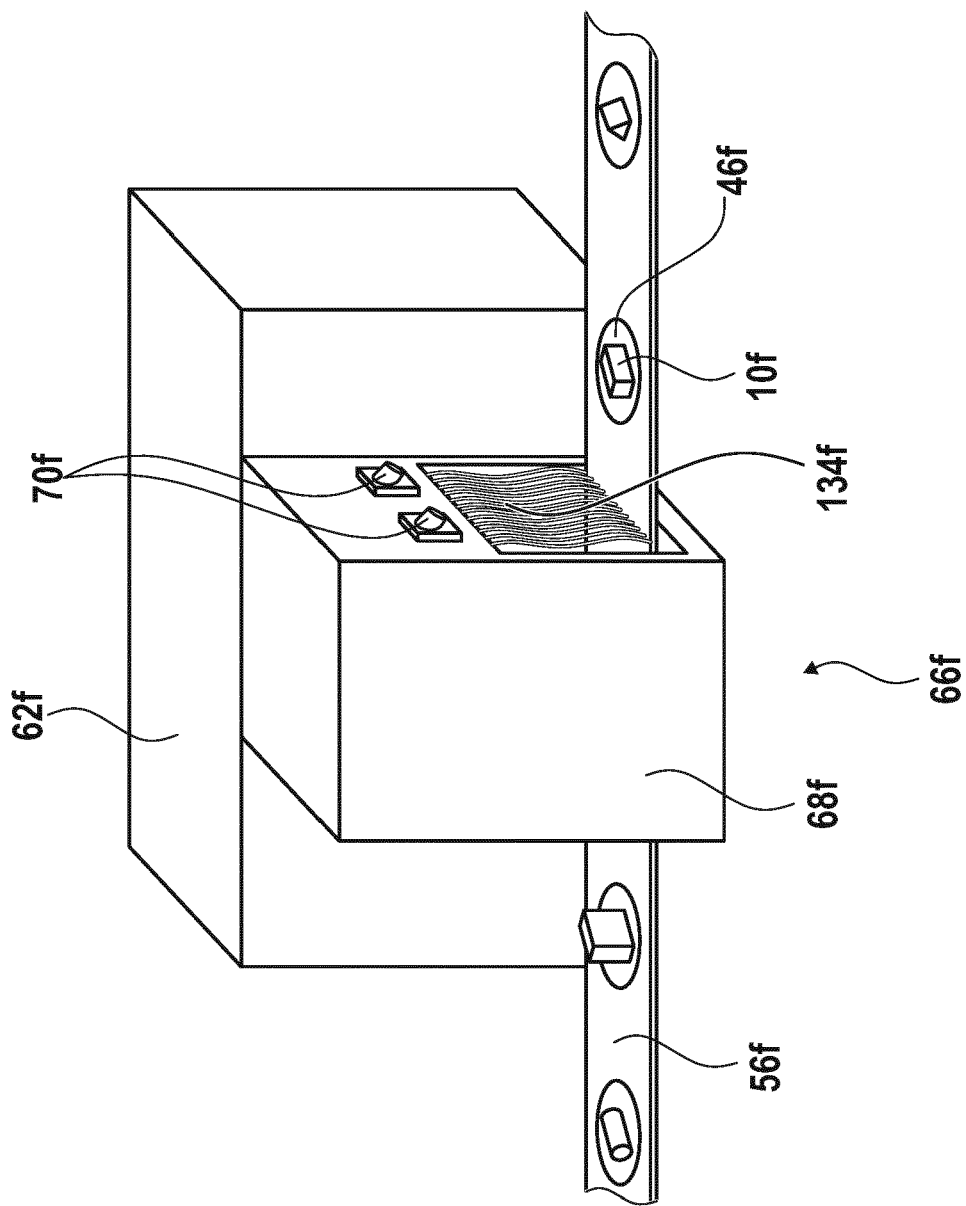
FIG. 11 shows a schematic representation of the lock chamber unit.

FIG. 11 shows the acquisition device, including a treatment unit 66f, which is intended for treating, in particular, for cleaning, at least one object 10f prior to acquisition of an object data set. Treatment unit 66f includes a lock chamber unit 68f. In particular, lock chamber unit 68f includes a fluid restriction unit 134f. Fluid restriction unit 134f has, in particular, plastic lamellae. Fluid restriction unit 134f preferably generates a flow resistance, in particular, to a flow into lock chamber unit 68f. Treatment unit 66f includes a fluid control unit 70f for controlling and/or regulating a fluid stream. Fluid control unit 70f preferably generates an air stream, which is directed away from lock chamber unit 68f. An air stream generated by fluid control unit 70f is preferably directed onto an object carrier 46f, which is located directly in front of fluid restriction unit 134f. An air stream generated by fluid control unit 70f is intended for blowing away dust particles and other contamination, which are situated on object carrier 46f and/or on an object 10f, in particular, in a direction facing away from lock chamber unit 68f. It is possible for other fluid control units to be installed inside of lock chamber unit 68f, for example, for generating a pressure above atmospheric in lock chamber unit 68f. It is also possible for the lock chamber unit to include a fluid control unit for generating a water jet, in order to clean an object situated in lock chamber unit 68f. Lock chamber unit 68f preferably includes a fluid control unit in the form of a heating fan, in order to dry an object situated in lock chamber unit 68f.

Figure 14:
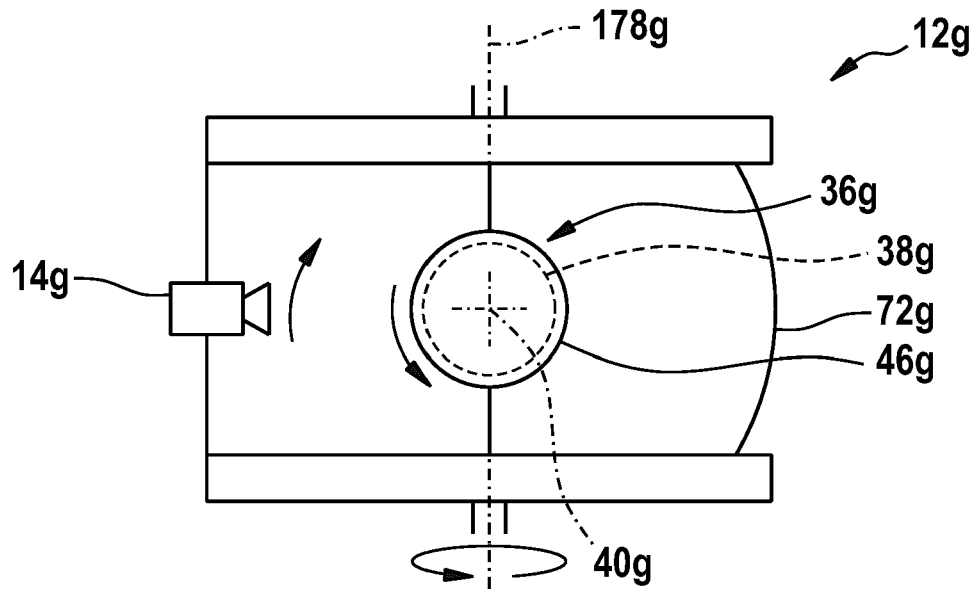
FIG. 14 shows a schematic representation of an alternative acquisition device.

FIG. 14 shows an alternative acquisition device for at least semiautomated acquisition of sets of multiple object data of at least one object (not shown here in further detail).

The acquisition device includes at least one movement device 12g for generating a defined, relative movement between at least one object data acquisition unit 14g of the acquisition device and the least one object and/or an object carrier unit 36g of the acquisition device. The acquisition device represented in FIG. 14 has a form at least substantially analogous to the acquisition device described in the description of FIGS. 1 through 3, which means that regarding an embodiment of the acquisition device represented in FIG. 14, reference may be made at least substantially to the description of FIGS. 1 through 3.

In contrast to the acquisition device described in the description of FIGS. 1 through 3, the acquisition device represented in FIG. 14 preferably includes a contrast unit 72g, which is supported, together with object data acquisition unit 14g, so as to be movable relative to object carrier unit 36g, in particular, with the aid of movement device 12g. Alternatively, or in addition, contrast unit 72g is supported by movement device 12g, so as to be movable relative to object data acquisition unit 14g. Object data acquisition unit 14g and/or contrast unit 72g are preferably supported by movement device 12g so as to be movable relative to object carrier unit 36g, about a swivel axis and/or axis of rotation 40g of a bearing unit 38g of movement device 12g. Movement device 12g preferably includes a drive unit (not represented here in further detail), which, in particular, in at least one operating state of the acquisition device, is intended for moving object data acquisition unit 14g, preferably, together with contrast unit 72g, in a direction opposite to a movement of object carrier unit 36g, in particular, about the swivel axis and/or axis of rotation 40g of bearing unit 38g. Preferably, object data acquisition unit 14g and/or contrast unit 72g are further supported by movement device 12g so as to be movable, relative to object carrier unit 36g, about a transverse horizontal axis 178g of movement device 12g running, in particular, at least substantially perpendicularly to the swivel axis and/or axis of rotation 40g of bearing unit 38g. It is possible for object carrier unit 36g to be supported in such a manner, that a support structure of the acquisition device, on which object carrier unit 36g is fixed in position or movably supported, has a longitudinal major axis, which runs at least substantially parallelly, in particular, coaxially, to horizontal axis 178g. When object carrier unit 36g is mounted on the support structure, then, viewed in a vertical plane, object data acquisition unit 14g and/or contrast unit 72g is/are advantageously supported by movement device 12g so as to be movable around object carrier unit 36g. Object data acquisition unit 14g and/or contrast unit 72g is preferably supported by movement device 12g so as to be movable, relative to a horizontal plane of the acquisition device, about horizontal axis 178g, along an angular range of less than 360°, in particular, less than 270°, preferably, less than 180°. Other options for moving object data acquisition unit 14g, contrast unit 72g and/or object carrier unit 36g relative to each other, which appear useful to one skilled in the art, are possible, as well.

Figure 15:
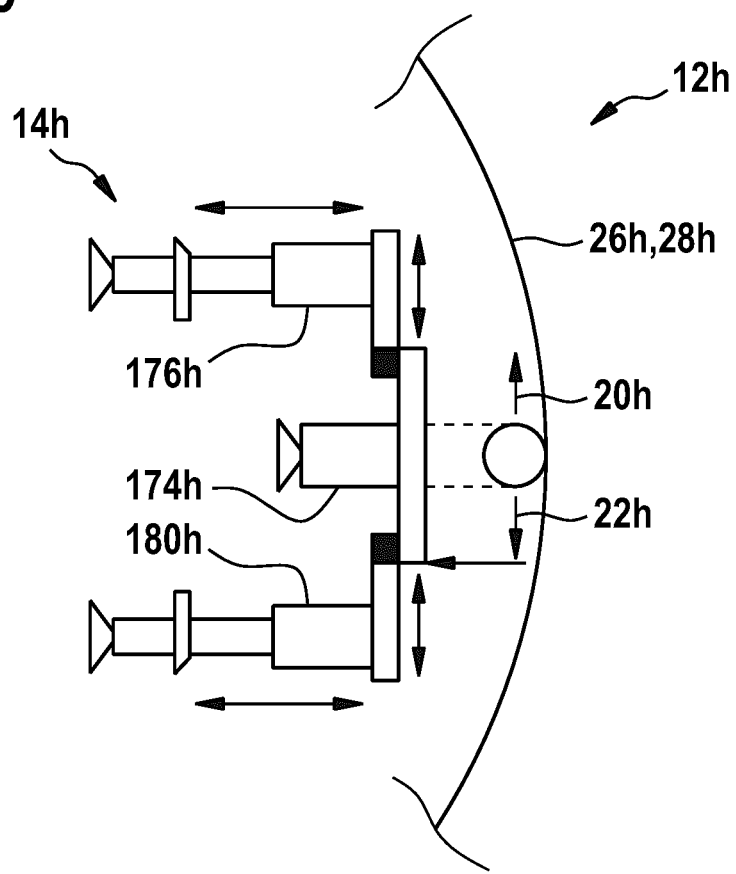
FIG. 15 shows a schematic representation of a further, alternative acquisition device.

FIG. 15 shows a further, alternative acquisition device for at least semiautomated acquisition of sets of multiple object data of at least one object (not shown here in further detail). The acquisition device includes at least one movement device 12h for generating a defined, relative movement between at least one object data acquisition unit 14h of the acquisition device and the least one object and/or an object carrier unit (not shown here in further detail) of the acquisition device. The acquisition device represented in FIG. 15 has a form at least substantially analogous to the acquisition device described in the description of FIGS. 1 through 3, which means that regarding an embodiment of the acquisition device represented in FIG. 15, reference may be made at least substantially to the description of FIGS. 1 through 3.

In contrast to the acquisition device described in the description of FIGS. 1 through 3, the acquisition device represented in FIG. 15 preferably includes at least one object data acquisition unit 14h, which has at least two acquisition units 174h, 176h, in particular, two cameras, which are supported by movement device 12h so as to be movable, in particular, relative to the object carrier unit. Object data acquisition device 14h preferably includes at least three acquisition units 174h, 176h, 180h, in particular, two cameras, which are supported by movement device 12h so as to be movable, in particular, relative to the object carrier unit. Acquisition units 174h, 176h, 180h are preferably supported by movement device 12h so as to be movable relative to each other and relative to the object carrier unit. Acquisition units 174h, 176h, 180h may be supported by the movement device so as to be rotatable about a swivel axis and/or axis of rotation of a bearing unit of movement device 12h; movably supported so as to be able to swivel, relative to the object carrier unit, in a vertical plane of the acquisition device containing the swivel axis and/or axis of rotation of the bearing unit; supported so as to be able to move relative to each other in the vertical plane of the acquisition device containing the swivel axis and/or axis of rotation of the bearing unit; and/or supported so as to be movable along and/or about a further axis appearing useful to one skilled in the art. Preferably, acquisition units 174h, 176h, 180h are cameras differently formed or equipped. Acquisition units 174h, 176h, 180h may differ, for example, in a form of an objective, of a focusing region, of a measuring angle, of an image sensor, and/or in other parameters appearing useful to one skilled in the art.

Figure 16:
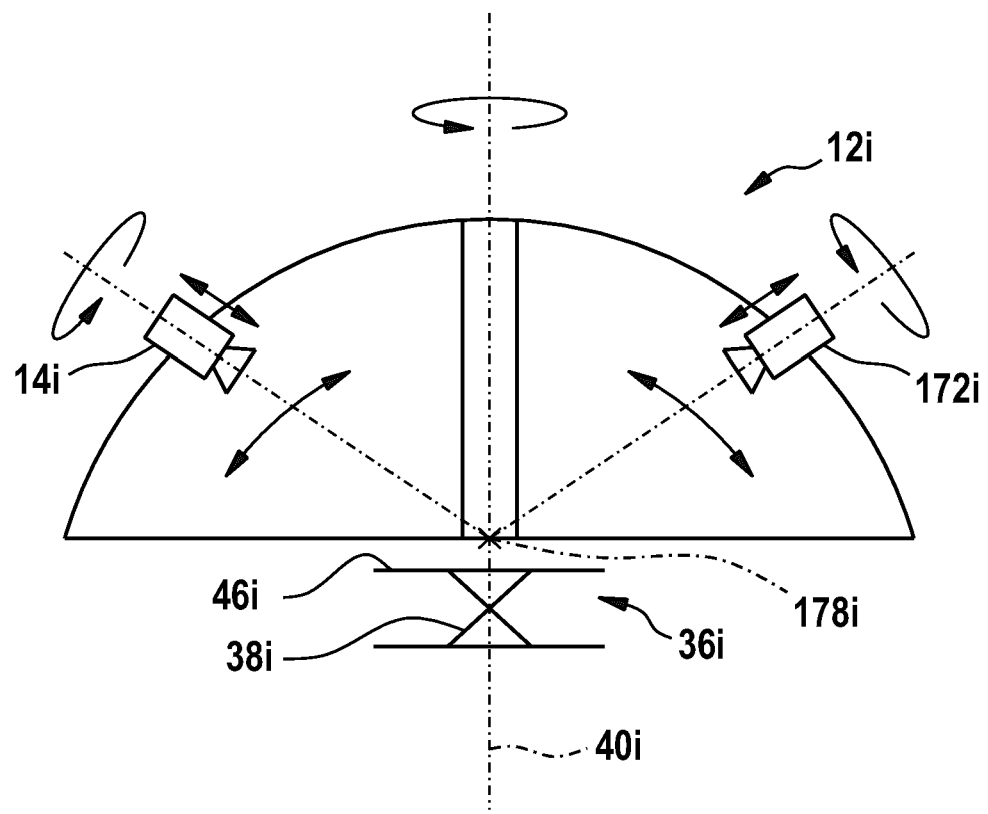
FIG. 16 shows a schematic representation of a further, alternative acquisition device.

FIG. 16 shows a further, alternative acquisition device for at least semiautomated acquisition of sets of multiple object data of at least one object (not shown here in further detail). The acquisition device includes at least one movement device 12i for generating a defined, relative movement between at least one object data acquisition unit 14i of the acquisition device and the least one object and/or an object carrier unit (not shown here in further detail) of the acquisition device. The acquisition device represented in FIG. 16 has a form at least substantially analogous to the acquisition device described in the description of FIGS. 1 through 3, which means that regarding an embodiment of the acquisition device represented in FIG. 16, reference may be made at least substantially to the description of FIGS. 1 through 3. In contrast to the acquisition device described in the description of FIGS. 1 through 3, the acquisition device represented in FIG. 16 preferably includes at least object data acquisition unit 14i and at least one further object data acquisition unit 172i, which are supported by movement device 12i so as to be movable relative to each other. The at least one object carrier unit 36i is preferably supported by movement device 12i so as to be movable relative to object data acquisition unit 14i and to further object data acquisition unit 172i. Object data acquisition unit 14i and further object data acquisition unit 172i may be designed to be identical or structurally different. Object data acquisition unit 14i and further object data acquisition unit 172i may have a plurality of acquisition units, in particular, cameras, or may each have one single acquisition unit.

Object data acquisition unit 14i is preferably supported by movement device 12i so as to be movable relative to a horizontal plane of the acquisition device, along an angular range of less than 360°, in particular, less than 270°, preferably, less than 180°, and particularly preferably, less than 100°. Further object data acquisition unit 172*i* is preferably supported by movement device 12*i* so as to be movable relative to a horizontal plane, along an angular range of less than 360°, in particular, less than 270°, preferably, less than 180°, and particularly preferably, less than 100°. Preferably, object data acquisition unit 14*i* and/or further object data acquisition unit 172*i* is/are additionally supported by movement device 12*i* so as to be movable about a swivel axis and/or axis of rotation 40*i* of a bearing unit 38*i* of movement device 12*i*. Further embodiments of the acquisition device, which appear useful to one skilled in the art, are likewise possible.

What is claimed is:

1. An acquisition device for at least semiautomated acquisition of sets of multiple object data of at least one object, comprising:
    a movement device configured to generate a defined relative movement between at least one object data acquisition unit and the at least one object, wherein the movement device includes at least one movement unit for a defined movement of the at least one object data acquisition unit; and
    a contrast unit that, as viewed from the object data acquisition unit, is situated behind an object measuring region and provides a uniform background during measuring of the object, wherein one of:
        the contrast unit includes an illumination unit, and viewed from the object data acquisition unit, the illumination unit of the acquisition device is situated behind the contrast unit and at least partially penetrates the contrast unit with radiation.

2. The acquisition device as recited in claim 1, wherein the movement device is configured for acquiring object data from multiple perspectives.

3. The acquisition device as recited in claim 1, further comprising:
    a processing unit configured to carry out an object learning operation.

4. The acquisition device as recited in claim 1, further comprising:
    a processing unit configured to control a forward movement and return movement of the object data acquisition unit and/or of the object for data acquisition.

5. The acquisition device as recited in claim 1, wherein the movement unit is configured to guide the at least one object data acquisition unit on an at least partially curved path of motion.

6. The acquisition device as recited in claim 1, wherein the movement unit has at least one partially curved track and is configured to guide the at least one object data acquisition unit along the at least partially curved track.

7. The acquisition device as recited in claim 1, wherein the movement unit is configured to guide the at least one object data acquisition unit along a direction at least substantially perpendicular to a path of motion.

8. The acquisition device as recited in claim 1, wherein the movement unit includes a drive unit configured to move the object data acquisition unit in an automated manner.

9. The acquisition device as recited in claim 1, further comprising:
    at least one object carrier unit;
    wherein the movement device includes a bearing unit by which the object carrier unit is rotationally mounted, so as to be movable relative to the object data acquisition unit.

10. The acquisition device as recited in claim 9, wherein the movement device includes a drive unit which is configured to move the object carrier unit and the object data acquisition unit in directions opposite to each other, about a swivel axis and/or axis of rotation of a bearing unit.

11. The acquisition device as recited in claim 1, further comprising:
    the at least one object data acquisition unit and at least one further object data acquisition unit, which are supported by the movement device so as to be movable relative to each other.

12. The acquisition device as recited in claim 11, further comprising:
    at least one object carrier unit which is supported by the movement device so as to be movable relative to the object data acquisition unit and to the further object data acquisition unit.

13. The acquisition device as recited in claim 1, further comprising:
    the at least one object data acquisition unit, which includes at least two cameras that are movably supported by the movement device.

14. A system, comprising:
    an acquisition device for at least semiautomated acquisition of sets of multiple object data of at least one object, the acquisition device including a movement device configured to generate a defined relative movement between at least one object data acquisition unit and the at least one object, wherein the movement device includes at least one movement unit for a defined movement of the at least one object data acquisition unit;
    a contrast unit that, as viewed from the object data acquisition unit, is situated behind an object measuring region and provides a uniform background during measuring of the object, wherein one of:
        the contrast unit includes an illumination unit, and viewed from the object data acquisition unit, the illumination unit of the acquisition device is situated behind the contrast unit and at least partially penetrates the contrast unit with radiation;
    a storage unit that stores data sets generated at least partially by the acquisition device;
    a mobile acquisition unit; and
    a processing unit configured to evaluate data acquired by the mobile acquisition unit in view of at least the stored data sets.

15. A method for acquiring sets of multiple object data of at least one object, the method comprising the following steps:
    providing an acquisition device for at least semiautomated acquisition of sets of multiple object data of the at least one object, the acquisition device including a movement device configured to generate a defined relative movement between the at least one object data acquisition unit and the at least one object, wherein the movement device includes at least one movement unit for a defined movement of the at least one object data acquisition unit; and
    providing a contrast unit that, as viewed from the object data acquisition unit, is situated behind an object measuring region and provides a uniform background during measuring of the object, wherein one of:
        the contrast unit includes an illumination unit, and viewed from the object data acquisition unit, the illumination unit of the acquisition device is situated behind the contrast unit and at least partially penetrates the contrast unit with radiation;

using the acquisition device to acquire the sets of multiple object data of the at least one object.

16. The method as recited in claim 15, further comprising the following steps:

moving an at least one object carrier unit carrying the at least one object via at least one object carrier, and the object data acquisition unit about a swivel axis and/or axis of rotation of a bearing unit of the movement device, in directions opposite to each other.

17. The acquisition device as recited in claim 1, further comprising:

at least one object carrier unit;

at least one object carrier loaded with the at least one object and detachably connected to the at least one object carrier unit, wherein the movement device generates the defined relative movement by moving the at least one object carrier unit; and a transport unit that includes a path conveyor unit that transports the at least object carrier, wherein:

the movement device includes a bearing unit that raises the at least one object carrier from the path conveyor unit in order for the at least one object data acquisition unit to acquire object data and lowers the at least one object carrier after the at least one object data acquisition unit acquired the object data.

18. The system as recited in claim 14, further comprising:

at least one object carrier unit;

at least one object carrier loaded with the at least one object and detachably connected to the at least one object carrier unit, wherein the movement device generates the defined relative movement by moving the at least one object carrier unit; and a transport unit that includes a path conveyor unit that transports the at least object carrier, wherein:

the movement device includes a bearing unit that raises the at least one object carrier from the path conveyor unit in order for the at least one object data acquisition unit to acquire object data and lowers the at least one object carrier after the at least one object data acquisition unit acquired the object data.

19. The method as recited in claim 15, further comprising:

providing at least one object carrier unit;

providing at least one object carrier loaded with the at least one object and detachably connected to the at least one object carrier unit, wherein the movement device generates the defined relative movement by moving the at least one object carrier unit; and providing a transport unit that includes a path conveyor unit that transports the at least object carrier, wherein:

the movement device includes a bearing unit that raises the at least one object carrier from the path conveyor unit in order for the at least one object data acquisition unit to acquire object data and lowers the at least one object carrier after the at least one object data acquisition unit acquired the object data.

20. The acquisition device as recited in claim 9, wherein the contrast unit is movable relative to the object carrier unit.

21. The acquisition device as recited in claim 1, wherein the contrast unit includes a light source that has an OLED screen.

22. The acquisition device as recited in claim 1, wherein the movement unit simultaneously moves the contrast unit and the object data acquisition unit.

23. The acquisition device as recited in claim 22, wherein at least after completion of a simultaneous movement of the contrast unit and the object data acquisition unit, the contrast unit and the object data acquisition unit have the same relative position and the same relative orientation with respect to each other as prior to the simultaneous movement.

24. The system as recited in claim 14, further comprising at least one object carrier unit which is supported by the movement device so as to be movable relative to the object data acquisition unit and to the further object data acquisition unit, wherein the contrast unit is movable relative to the object carrier unit.

25. The system as recited in claim 14, wherein the contrast unit includes a light source that has an OLED screen.

26. The system as recited in claim 14, wherein the movement unit simultaneously moves the contrast unit and the object data acquisition unit.

27. The system as recited in claim 26, wherein at least after completion of a simultaneous movement of the contrast unit and the object data acquisition unit, the contrast unit and the object data acquisition unit have the same relative position and the same relative orientation with respect to each other as prior to the simultaneous movement.

28. The method as recited in claim 16, wherein the contrast unit is movable relative to the object carrier unit.

29. The method as recited in claim 15, wherein the contrast unit includes a light source that has an OLED screen.

30. The method as recited in claim 15, further comprising operating the movement unit to simultaneously move the contrast unit and the object data acquisition unit.

31. The method as recited in claim 30, wherein at least after completion of a simultaneous movement of the contrast unit and the object data acquisition unit, the contrast unit and the object data acquisition unit have the same relative position and the same relative orientation with respect to each other as prior to the simultaneous movement.

* * * * *